(12) United States Patent
Suehiro et al.

(10) Patent No.: US 12,423,304 B2
(45) Date of Patent: Sep. 23, 2025

(54) CONTROL METHOD, COMPUTER-READABLE RECORDING MEDIUM STORING CONTROL PROGRAM, AND INFORMATION PROCESSING DEVICE

(71) Applicant: Fujitsu Limited, Kawasaki (JP)

(72) Inventors: Yoshitaka Suehiro, Kobe (JP); Masao Tomofuji, Kobe (JP); Shigeyuki Dambayashi, Kakogawa (JP); Tsuyoshi Oyake, Akashi (JP); Hayato Okada, Ikeda (JP); Chikara Saito, Chigasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/350,253

(22) Filed: Jul. 11, 2023

(65) Prior Publication Data

US 2024/0111770 A1 Apr. 4, 2024

(30) Foreign Application Priority Data

Oct. 3, 2022 (JP) .................................. 2022-159778

(51) Int. Cl.
*G06F 16/30* (2019.01)
*G06F 16/22* (2019.01)
(Continued)

(52) U.S. Cl.
CPC ........ *G06F 16/24545* (2019.01); *G06F 16/22* (2019.01); *G06F 16/2455* (2019.01); *G06F 16/2462* (2019.01)

(58) Field of Classification Search
CPC .............. G06F 16/24545; G06F 16/22; G06F 16/2455; G06F 16/2462
See application file for complete search history.

(56) References Cited

U.S. PATENT DOCUMENTS

| 2010/0153363 | A1 | 6/2010 | Suzuki et al. | |
|---|---|---|---|---|
| 2011/0099403 | A1* | 4/2011 | Miyata | G06F 9/5088 718/1 |

(Continued)

FOREIGN PATENT DOCUMENTS

| JP | 2010-140357 | 6/2010 |
|---|---|---|
| JP | 2020-123003 | 8/2020 |

(Continued)

*Primary Examiner* — Khanh B Pham
(74) *Attorney, Agent, or Firm* — STAAS & HALSEY LLP

(57) ABSTRACT

A control method in which a computer executes processing includes: specifying a first data group of which a processing load of a query is less than a first reference value, in a first data constellation, based on statistical information that indicates a statistical value regarding the processing load of the query, for each data group to be an access unit of the query, in the first data constellation included in a first execution environment included in a plurality of execution environments that has different data constellations; specifying a second execution environment that has a second data constellation that includes the specified first data group, included in the plurality of execution environments, other than the first execution environment; and controlling the plurality of execution environments to transmit a new query that uses the specified first data group as an access unit to the specified second execution environment.

14 Claims, 19 Drawing Sheets

(51) Int. Cl.
    *G06F 16/2453*     (2019.01)
    *G06F 16/2455*     (2019.01)
    *G06F 16/2458*     (2019.01)

(56) References Cited

U.S. PATENT DOCUMENTS

| | | | |
|---|---|---|---|
| 2016/0156568 A1* | 6/2016 | Naganuma | G06F 9/5083 |
| | | | 709/226 |
| 2017/0161105 A1* | 6/2017 | Barrett | G06F 9/4881 |
| 2017/0285983 A1* | 10/2017 | Matsubara | G06F 3/0619 |
| 2019/0347120 A1* | 11/2019 | Kottomtharayil | G06F 9/45533 |
| 2020/0259893 A1* | 8/2020 | James | H04L 67/1044 |
| 2021/0004259 A1* | 1/2021 | Deshpande | G06F 9/5077 |
| 2021/0397357 A1* | 12/2021 | Azuma | G06F 3/0607 |
| 2022/0100548 A1 | 3/2022 | Ito | |
| 2022/0129294 A1 | 4/2022 | Iwasa | |

FOREIGN PATENT DOCUMENTS

| | | |
|---|---|---|
| JP | 2020-123848 | 8/2020 |
| WO | WO 2017/064779 A1 | 4/2017 |

* cited by examiner

FIG. 1
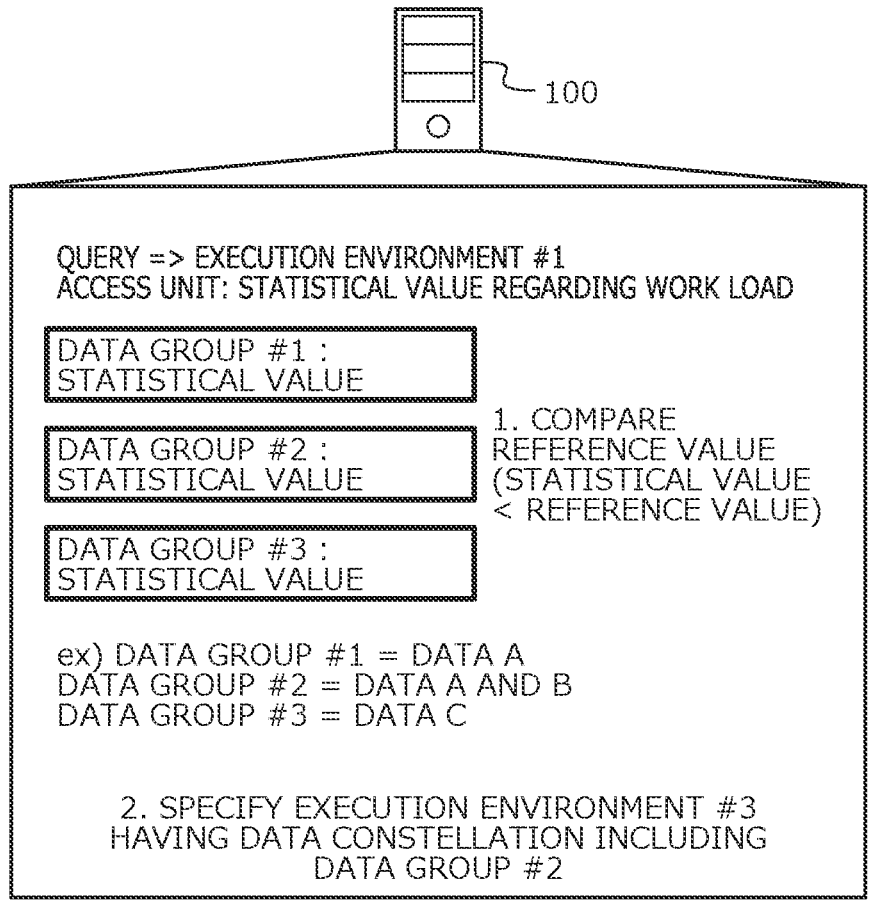
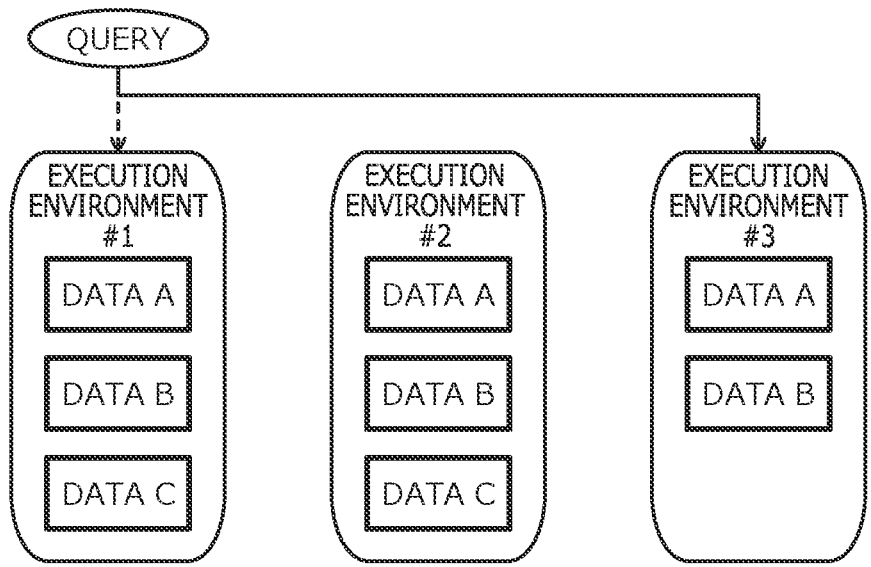

FIG. 6

| ID | QUERY CONTENT | NUMBER OF EXECUTIONS | MINIMUM TIME | MAXIMUM TIME | AVERAGE TIME | POPULATION STANDARD DEVIATION |
|---|---|---|---|---|---|---|
| 1 | select * from A; | 10 | 9 SECONDS | 11 SECONDS | 10 SECONDS | 0.1 |
| 2 | select * from A join B using(id) where id = 1; | 600 | 499 SECONDS | 501 SECONDS | 50 SECONDS | 0.1 |
| 3 | select * from C; | 5000 | 10 SECONDS | 50000 SECONDS | 10000 SECONDS | 10 |

| TOTAL NUMBER OF SHARED BLOCKS | TOTAL NUMBER OF CACHES |
|---|---|
| 100 | 100 |
| 50 | 50 |
| 10000 | 50 |

FIG. 9

| ID | QUERY CONTENT | NUMBER OF EXECUTIONS | MINIMUM TIME | MAXIMUM TIME | AVERAGE TIME |
|---|---|---|---|---|---|
| 1 | select * from A; | 10 | 9 SECONDS | 11 SECONDS | 10 SECONDS |
| 2 | select * from A join B using(id) where id = 1; | 600 | 499 SECONDS | 501 SECONDS | 50 SECONDS |
| 3 | select * from C; | 5000 | 10 SECONDS | 50000 SECONDS | 10000 SECONDS |

600

600-3

| POPULATION STANDARD DEVIATION | TOTAL NUMBER OF SHARED BLOCKS | TOTAL NUMBER OF CACHES |
|---|---|---|
| 0.1 | 100 | 100 |
| 0.1 | 50 | 50 |
| 10 | 10000 | 50 |

≥ FIRST THRESHOLD?
→id「3」&QUERY CONTENT「select * from C;」

| id | QUERY CONTENT | NUMBER OF EXECUTIONS | MINIMUM TIME | MAXIMUM TIME | AVERAGE TIME | POPULATION STANDARD DEVIATION |
|---|---|---|---|---|---|---|
| 1 | select * from A; | 10 | 9 SECONDS | 11 SECONDS | 10 SECONDS | 0.1 |
| 2 | select * from A join B using(id) where id = 1; | 600 | 499 SECONDS | 501 SECONDS | 50 SECONDS | 0.1 |
| 3 | select * from C; | 5000 | 10 SECONDS | 50000 SECONDS | 10000 SECONDS | 10 |

| TOTAL NUMBER OF SHARED BLOCKS | TOTAL NUMBER OF CACHES |
|---|---|
| 100 | 100 |
| 50 | 50 |
| 10000 | 50 |

CALCULATE EVALUATION VALUE

FIG. 11

| ID | QUERY CONTENT | NUMBER OF EXECUTIONS | MINIMUM TIME | MAXIMUM TIME | AVERAGE TIME | POPULATION STANDARD DEVIATION | TOTAL NUMBER OF SHARED BLOCKS | TOTAL NUMBER OF CACHES |
|---|---|---|---|---|---|---|---|---|
| 1 | select * from A; | 10 | 9 SECONDS | 11 SECONDS | 10 SECONDS | 0.1 | 100 | 100 |
| 2 | select * from A join B using(id) where id = 1; | 600 | 499 SECONDS | 501 SECONDS | 50 SECONDS | 0.1 | 50 | 50 |
| 3 | select * from C; | 5000 | 10 SECONDS | 50000 SECONDS | 10000 SECONDS | 10 | 10000 | 50 |

≥ THIRD THRESHOLD?

< SECOND THRESHOLD?

id [2] &QUERY CONTENT [select * from A join B using(id) where id = 1;]

CALCULATE EVALUATION VALUE

CONTROL METHOD, COMPUTER-READABLE RECORDING MEDIUM STORING CONTROL PROGRAM, AND INFORMATION PROCESSING DEVICE

CROSS-REFERENCE TO RELATED APPLICATION

This application is based upon and claims the benefit of priority of the prior Japanese Patent Application No. 2022-159778, filed on Oct. 3, 2022, the entire contents of which are incorporated herein by reference.

FIELD

The embodiment discussed herein is related to a control method, a control program, and an information processing device.

BACKGROUND

Typically, a system exists in which one or more containers having different table constellations are arranged and each of a plurality of execution environments performs predetermined calculation using the table constellation included in any one of the one or more containers. For example, there is a case where it is desired to add or remove the container having the table constellation, according to a processing status of each container. For example, the addition is referred to as scale-out. For example, the removal is referred to as scale-in.

Japanese Laid-open Patent Publication No. 2010-140357 is disclosed as related art.

SUMMARY

According to an aspect of the embodiments, a control method in which a computer executes processing includes: specifying a first data group of which a processing load of a query is less than a first reference value, in a first data constellation, based on statistical information that indicates a statistical value regarding the processing load of the query, for each data group to be an access unit of the query, in the first data constellation included in a first execution environment included in a plurality of execution environments that has different data constellations; specifying a second execution environment that has a second data constellation that includes the specified first data group, included in the plurality of execution environments, other than the first execution environment; and controlling the plurality of execution environments to transmit a new query that uses the specified first data group as an access unit to the specified second execution environment.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an explanatory diagram illustrating an example of a control method according to an embodiment;

FIG. 6 is an explanatory diagram illustrating an example of storage content of a statistical information management table 600;

FIG. 9 is an explanatory diagram illustrating an example for specifying a high-load query;

FIG. 11 is an explanatory diagram illustrating an example of calculating an evaluation value of evacuation;

DESCRIPTION OF EMBODIMENTS

Figure 2:
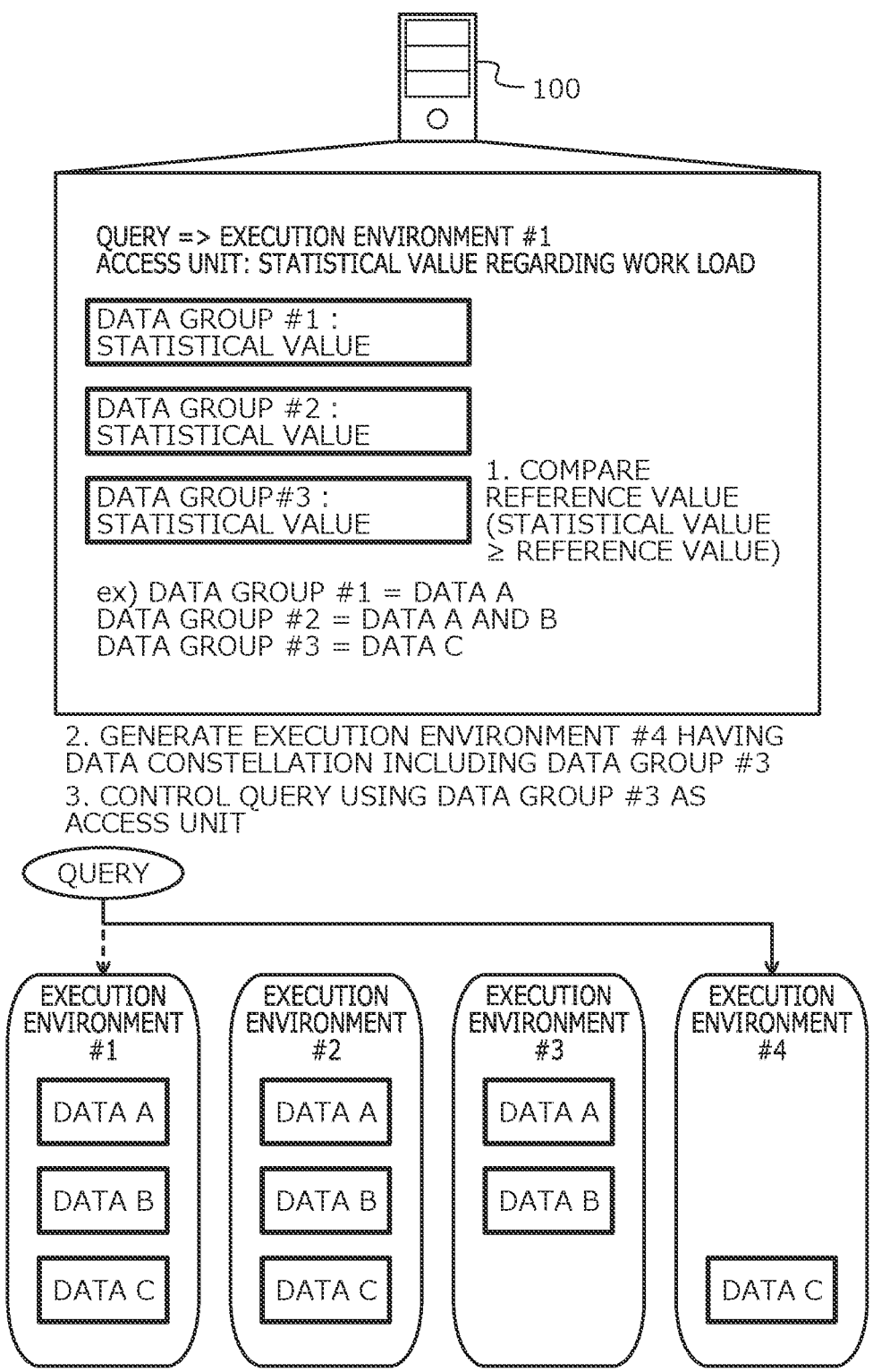
FIG. 2 is an explanatory diagram illustrating another example of the control method according to the embodiment.

As the related art, for example, there is a technique that calculates a transition cost of each query, based on a server state table created from a query state table of a collected transition source agent processing program, selects a query, of which the transition cost is small, as a transition query, and transitions the selected query.

However, the related art has a problem in that a processing load applied to an entire system increases when scale-out is performed. For example, when scale-out is performed, a new container to be added is created, and the processing load applied to the entire system increases. For example, when scale-out is performed, as a size of a table constellation stored in the new container to be added is larger, the processing load applied to the entire system increases.

In one aspect, an object of the embodiment is to reduce a processing load.

Hereinafter, embodiments of a control method, a control program, and an information processing device will be described in detail with reference to the drawings.

(Example of Control Method According to Embodiment)

FIG. 1 is an explanatory diagram illustrating an example of a control method according to an embodiment. An information processing device 100 is a computer used to manage a container having a data constellation. Data of the data constellation is, for example, a database (DB), a table, a file, or the like. In the following description, the data is assumed as a "table".

Typically, a system exists in which one or more containers having different table constellations are arranged and each of a plurality of execution environments, performing predetermined calculation, performs predetermined calculation using the table constellation included in any one of the one or more containers. The container is, for example, a type of execution environment. The system is, for example, a computer cluster. The system is implemented on a cloud, for example.

For example, the system is implemented on a hybrid cloud including a plurality of different types of execution environments such as a virtual machine, a private cloud that performs predetermined calculation. In the hybrid cloud, the plurality of different types of execution environments such as virtual machines or private clouds uses a table constellation. Therefore, it is desirable to dispose a container having a table constellation and to reduce an operation load. The system realizes, for example, an electronic commerce (EC) shop.

Here, there is a case where it is desired to add or remove a container having a table constellation, according to a processing status of each container. For example, the addition is referred to as scale-out. For example, the removal is referred to as scale-in. For example, in response to an increase in a processing load of any one of the containers, it is considered to add a replica of the container having the same table constellation as the container.

For example, in a case where goods are sold at a low price in the EC shop in a certain period, the number of users of the EC shop, the number of accesses of the EC shop, or the like increases, and the processing load applied to each container tends to increase. Therefore, it is desirable to add the container. On the other hand, in a case where the period in which the goods are sold at a low price in the EC shop ends, the number of users of the EC shop, the number of accesses of the EC shop, or the like decreases, and the processing load applied to each container tends to decrease. Therefore, it is desirable to remove the container. For example, if the container is not removed, the operation cost of the system increases. The operation cost is, for example, a rental fee of a resource, an electric fee, or the like used to implement the container.

However, typically, there is a problem in that, when a container is added, the processing load applied to the entire system increases or a performance of the entire system deteriorates, for example. For example, when a container is added, a new container to be added is created. Therefore, there is a case where, before creation of the new container to be added is completed, a service provided by the system stops, or a performance of the service provided by the system deteriorates. Furthermore, since the processing of creating the new container is executed in the entire system to be added, the processing load applied to the entire system increases.

For example, when the container is added, as a size of a table constellation stored in the new container to be added is larger, the processing load applied to the entire system increases. For example, as the size of the table constellation to be copied to the new container to be added from the existing container is larger, a processing load applied to a communication band of the entire system increases. Furthermore, for example as the size of the table constellation to be copied to the new container to be added is larger, a resource amount for mounting the new container to be added increases, and the operation cost of the system easily increases. Furthermore, there is a case where a table that does not need to be copied is copied to the new container to be added from the existing container, the operation cost of the system easily increases.

Therefore, in the present embodiment, a control method that can reduce a processing load of an entire system will be described.

In FIG. 1, the information processing device 100 can control a plurality of execution environments. The execution environment is, for example, a container, a virtual machine, or the like. The execution environment includes a data constellation. Data of the data constellation is, for example, a table. The plurality of execution environments has, for example, different data constellations. The plurality of execution environments may include two or more execution environments having the same data constellation. The plurality of execution environments implements a system. The plurality of execution environments implements, for example, a system that provides a service. In the example in FIG. 1, an execution environment #1, an execution environment #2, and an execution environment #3 exist. For example, the information processing device 100 can add a new execution environment to the plurality of execution environments. For example, the information processing device 100 can delete an existing execution environment from the plurality of execution environments.

The information processing device 100 can control access to the plurality of execution environments. For example, the information processing device 100 can control to which execution environment among the plurality of execution environments a query accessing a data group is transmitted. The data group is one or more pieces of data. In the example in FIG. 1, a data group #1 is, for example, data A. A data group #2 is, for example, data A and data B. A data group #3 is, for example, data C. For example, the information processing device 100 can receive a query, can specify an execution environment to be a transmission destination of the received query from among the plurality of execution environments, and can transmit the received query to the specified execution environment.

The information processing device 100 stores statistical information. The statistical information is information regarding any one of the plurality of execution environments. The statistical information indicates a statistical value regarding a processing load of the query, for each data group to be an access unit of the query, in a data constellation included in the execution environment, for any one of the plurality of execution environments. The statistical information indicates, for example, a statistical value regarding a processing load of the query, for each data group to be the access unit of the query, in a first data constellation included in a first execution environment included in the plurality of execution environments.

The statistical value includes, for example, an average time, a minimum time, a maximum time, or the like of a query processing time. The statistical value includes, for example, a population standard deviation regarding the query processing time, or the like. The statistical value includes, for example, the number of times when a query is received. For example, the information processing device 100 may store the statistical information regarding each of the plurality of execution environments.

(1-1) The information processing device 100 specifies a first data group of which a processing load of a query is less than a first reference value, from the first data constellation included in the first execution environment, based on the statistical information regarding the first execution environment included in the plurality of execution environments. For example, the information processing device 100 specifies the first data group of which a population standard deviation is less than the first reference value, from the first data constellation included in the first execution environment, based on the statistical information. In the example in FIG. 1, for example, the information processing device 100 specifies a data group #2 of which a population standard deviation is less than the first reference value, from a data constellation included in the execution environment #1, based on statistical information regarding the execution environment #1.

As a result, the information processing device 100 can determine whether or not it is preferable to change a transmission destination of a query using which data group as an access unit from the first execution environment to another execution environment, in order to reduce a processing load of the first execution environment. For example, the information processing device 100 can determine that it is preferable to change the transmission destination of the query using the first data group as the access unit from the first execution environment to the another execution environment.

(1-2) The information processing device 100 specifies a second execution environment having a second data constellation including the specified first data group, included in the plurality of execution environments, other than the first execution environment. In the example in FIG. 1, for example, the information processing device 100 specifies the execution environment #3 having the data constellation including the data A and the data B to be the data group #2. As a result, the information processing device 100 can specify the second execution environment as the another execution environment to be the transmission destination of the query using the first data group as the access unit, instead of the first execution environment.

(1-3) The information processing device 100 controls the plurality of execution environments to transmit a new query using the specified first data group as the access unit to the specified second execution environment. For example, when receiving the new query using the specified first data group as the access unit, the information processing device 100 transmits the received new query to the specified second execution environment. In the example in FIG. 1, for example, when receiving a new query using the data group #2 as the access unit, the information processing device 100 transmits the received new query to the execution environment #3.

As a result, the information processing device 100 can reduce the processing load of the first execution environment, without adding a new execution environment. The information processing device 100 increases a resource amount that can be used for another query using data other than the first data group as the access unit, other than the query using the first data group as the access unit, in the first execution environment and can improve a processing performance regarding the another query.

For example, a case is considered where the another query using the data other than the first data group as the access unit, of which the processing load is relatively larger than the query using the first data group as the access unit is handled in the first execution environment. In this case, for example, the information processing device 100 increases the resource amount that can be used for the another query of which the processing load is relatively large in the first execution environment and can improve the processing performance regarding the another query of which the processing load is relatively large.

Therefore, the information processing device 100 can quickly suppress the increase in the processing load applied to the entire system, the deterioration of the performance of the entire system, or the like. Furthermore, the information processing device 100 can suppress the increase in the operation cost of the system.

Here, a case has been described where the information processing device 100 can add a new execution environment to the plurality of execution environments. However, the embodiment is not limited to this. For example, there may be a case where another computer has a function for adding a new execution environment to the plurality of execution environments. In this case, by controlling the another computer, the information processing device 100 controls the plurality of execution environments to add the new execution environment to the plurality of execution environments.

Here, a case has been described where the information processing device 100 can delete one existing execution environment from the plurality of execution environments. However, the embodiment is not limited to this. For example, there may be a case where another computer has a function for deleting one existing execution environment from the plurality of execution environments. In this case, by controlling the another computer, the information processing device 100 controls the plurality of execution environments to delete one existing execution environment from the plurality of execution environments.

Here, a case has been described where the information processing device 100 can transmit the received query to any one of the plurality of execution environments. However, the embodiment is not limited to this. For example, there may be a case where another computer has a function for receiving a query and transmitting the query to any one of the plurality of execution environments. In this case, by controlling the another computer, the information processing device 100 controls to which one of the plurality of execution environments the query is transmitted.

Here, a case where the information processing device 100 works independently has been described. However, the information processing device 100 is not limited to this. For example, there may be a case where the information processing device 100 cooperates with another computer. For example, there may be a case where a plurality of computers implements functions as the information processing device 100. For example, there may be a case where the function as the information processing device 100 is implemented on a cloud.

(Another Example of Control Method According to Embodiment)

Next, another example of an information processing method according to the embodiment will be described with reference to FIG. 2. FIG. 2 is an explanatory diagram illustrating the another example of the control method according to the embodiment.

In FIG. 2, the information processing device 100 can control a plurality of execution environments. The execution environment is, for example, a container, a virtual machine, or the like. The execution environment includes a data constellation. Data of the data constellation is, for example, a table. The plurality of execution environments has, for example, different data constellations. The plurality of execution environments may include two or more execution environments having the same data constellation. In the example in FIG. 2, an execution environment #1, an execution environment #2, and an execution environment #3 exist. For example, the information processing device 100 can add a new execution environment to the plurality of execution environments. For example, the information processing device 100 can delete an existing execution environment from the plurality of execution environments.

The information processing device 100 can control access to the plurality of execution environments. For example, the information processing device 100 can control to which execution environment among the plurality of execution environments a query accessing a data group is transmitted. The data group is one or more pieces of data. In the example in FIG. 2, a data group #1 is, for example, data A. A data group #2 is, for example, data A and data B. A data group #3 is, for example, data C. For example, the information processing device 100 can receive a query, can specify an execution environment to be a transmission destination of the received query from among the plurality of execution environments, and can transmit the received query to the specified execution environment.

The information processing device 100 stores statistical information. The statistical information is information regarding any one of the plurality of execution environments. The statistical information indicates a statistical value regarding a processing load of the query, for each data group to be an access unit of the query, in a data constellation included in the execution environment, for any one of the plurality of execution environments. The statistical information indicates, for example, a statistical value regarding a processing load of the query, for each data group to be the access unit of the query, in a first data constellation included in a first execution environment included in the plurality of execution environments.

The statistical value includes, for example, an average time, a minimum time, a maximum time, or the like of a query processing time. The statistical value includes, for example, a population standard deviation regarding the query processing time, or the like. The statistical value includes, for example, the number of times when a query is received. For example, the information processing device 100 may store the statistical information regarding each of the plurality of execution environments.

(2-1) The information processing device 100 specifies a first data group of which a processing load of a query is equal to or more than a first reference value, in the first data constellation included in the first execution environment, based on the statistical information regarding the first execution environment included in the plurality of execution environments. For example, the information processing device 100 specifies the first data group of which a population standard deviation is equal to or more than the first reference value, from the first data constellation included in the first execution environment, based on the statistical information. In the example in FIG. 2, for example, the information processing device 100 specifies the data group #3.

As a result, the information processing device 100 can determine whether or not it is preferable to prepare a new execution environment as a transmission destination of a query using which data group as the access unit, in order to suppress the processing load of the first execution environment. For example, the information processing device 100 can determine that it is preferable to prepare the new execution environment, as the transmission destination of the query using the specified first data group as the access unit.

(2-2) The information processing device 100 generates a new second execution environment, different from the plurality of execution environments, having the second data constellation that includes the specified first data group and does not include at least any one piece of the first data constellation and adds the second execution environment to the plurality of execution environments. In the example in FIG. 2, for example, the information processing device 100 generates an execution environment #4 having a data constellation including the data C to be the data group #3 and adds the execution environment #4 to the plurality of execution environments. As a result, the information processing device 100 can prepare a new execution environment as the transmission destination of the query using the specified first data group as the access unit.

(2-3) The information processing device 100 controls the plurality of execution environments to transmit the new query using the specified first data group as the access unit to the added second execution environment. For example, when receiving the new query using the specified first data group as the access unit, the information processing device 100 transmits the received new query to the added second execution environment. In the example in FIG. 2, for example, when receiving a new query using the data group #3 as the access unit, the information processing device 100 transmits the received new query to the execution environment #4.

As a result, the information processing device 100 can reduce the processing load of the first execution environment. When adding the new second execution environment, the information processing device 100 can enable the second execution environment to process the new query using the first data group as the access unit and can reduce a data amount of the second data constellation included in the second execution environment. Therefore, the information processing device 100 can suppress an increase in a processing load and a processing time applied to the entire system when the second execution environment is added, deterioration in the performance of the entire system, or the like. Furthermore, the information processing device 100 can suppress the increase in the operation cost of the system.

Here, a case has been described where the information processing device 100 can add a new execution environment to the plurality of execution environments. However, the embodiment is not limited to this. For example, there may be a case where another computer has a function for adding a new execution environment to the plurality of execution environments. In this case, by controlling the another computer, the information processing device 100 controls the plurality of execution environments to add the new execution environment to the plurality of execution environments.

Here, a case has been described where the information processing device 100 can delete one existing execution environment from the plurality of execution environments. However, the embodiment is not limited to this. For example, there may be a case where another computer has a function for deleting one existing execution environment from the plurality of execution environments. In this case, by controlling the another computer, the information processing device 100 controls the plurality of execution environments to delete one existing execution environment from the plurality of execution environments.

Here, a case has been described where the information processing device 100 can transmit the received query to any one of the plurality of execution environments. However, the embodiment is not limited to this. For example, there may be a case where another computer has a function for receiving a query and transmitting the query to any one of the plurality of execution environments. In this case, by controlling the another computer, the information processing device 100 controls to which one of the plurality of execution environments the query is transmitted.

Here, a case where the information processing device 100 works independently has been described. However, the information processing device 100 is not limited to this. For example, there may be a case where the information processing device 100 cooperates with another computer. For example, there may be a case where a plurality of computers implements functions as the information processing device 100. For example, there may be a case where the function as the information processing device 100 is implemented on a cloud.

Here, there may be a case where the information processing device 100 has both of a function for realizing the example illustrated in FIG. 1 and a function for realizing the example illustrated in FIG. 2. There may be a case where the information processing device 100 has only one of the function for realizing the example illustrated in FIG. 1 and the function for realizing the example illustrated in FIG. 2. In the following description, mainly, a case will be described where the information processing device 100 has both of the function for realizing the example illustrated in FIG. 1 and the function for realizing the example illustrated in FIG. 2.

(Example of Information Processing System 300)

Next, an example of an information processing system 300 to which the information processing device 100 illustrated in FIG. 1 or FIG. 2 is applied will be described with reference to FIG. 3.

Figure 3:
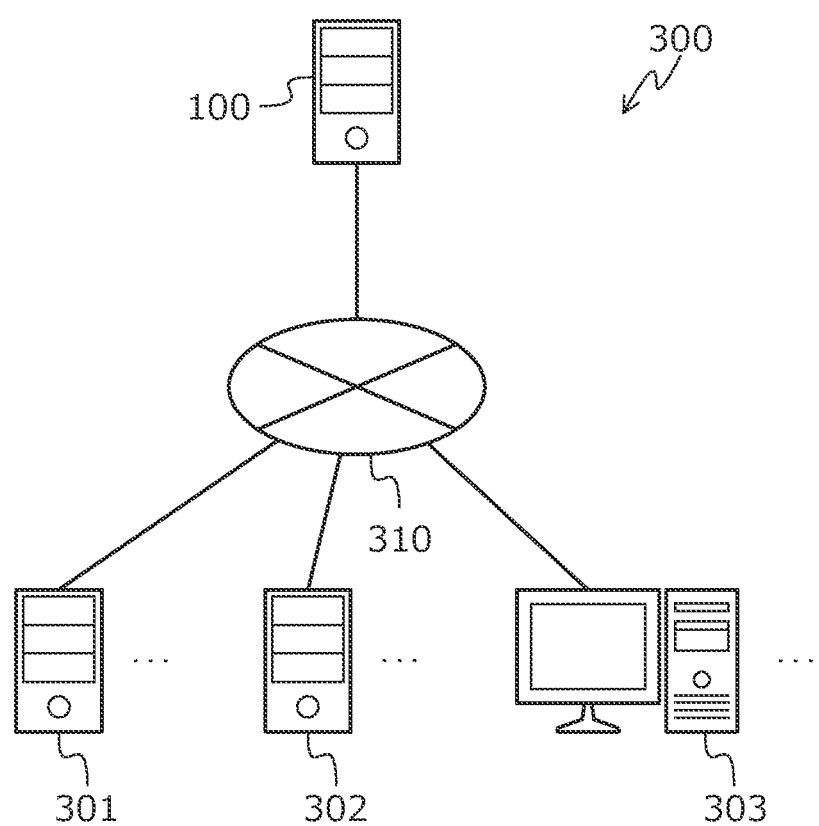
FIG. 3 is an explanatory diagram illustrating an example of an information processing system 300.

FIG. 3 is an explanatory diagram illustrating an example of the information processing system 300. In FIG. 3, the information processing system 300 includes the information processing device 100, one or more communication control devices 301, one or more information accumulation devices 302, and one or more client devices 303.

In the information processing system 300, the information processing device 100 and the communication control device 301 are coupled via a wired or wireless network 310. The network 310 is, for example, a local area network (LAN), a wide area network (WAN), the Internet, or the like.

In the information processing system 300, the information processing device 100 and the information accumulation device 302 are coupled via the wired or wireless network 310. In the information processing system 300, the information processing device 100 and the client device 303 are coupled via the wired or wireless network 310.

In the information processing system 300, the communication control device 301 and the information accumulation device 302 are coupled via the wired or wireless network 310. In the information processing system 300, the communication control device 301 and the client device 303 are coupled via the wired or wireless network 310. In the information processing system 300, the information accumulation device 302 and the client device 303 are coupled via the wired or wireless network 310.

The information processing device 100 can control the plurality of containers having different table constellations. The container corresponds to the execution environment. The container including the table constellation is, for example, executed by the information accumulation device 302. For example, the information processing device 100 can control the information accumulation device 302 that implements the container. For example, the information processing device 100 can control the information accumulation device 302 to generate a new container. For example, the information processing device 100 can control the information accumulation device 302 to delete an existing container.

The information processing device 100 can control access to a container. For example, the information processing device 100 can control the communication control device 301 that relays a query for the container. For example, the information processing device 100 can control the communication control device 301 that relays a query for the container.

The information processing device 100 stores statistical information for each container. The statistical information indicates a statistical value regarding a processing load of the query, for each table group to be an access unit of the query, among the table constellation included in the container. The information processing device 100 stores, for example, a statistical information management table 600 to be described later with reference to FIG. 6.

The statistical information management table 600 is prepared for each container, for example. The statistical information management table 600 may collectively store and manage the statistical information regarding the plurality of containers. In the following description, a case will be described where the statistical information management table 600 is prepared for each container. The statistical value includes, for example, an average time, a minimum time, a maximum time, or the like of a query processing time. The statistical value includes, for example, a population standard deviation regarding the query processing time, or the like. The statistical value includes, for example, the number of times when a query is received.

The information processing device 100 refers to the statistical information management table 600 and controls the communication control device 301 to change a container to be a transmission destination of a query using one table group as an access unit, so as to reduce a processing load of the information processing system 300. The information processing device 100 refers to the statistical information management table 600 and controls the information accumulation device 302 to generate a container to be the transmission destination of the query using one table group as the access unit, so as to reduce the processing load of the information processing system 300.

The information processing device 100 stores the transmission destination of the query in a query information management table 700 to be described later with reference to FIG. 7 and manages the transmission destination of the query. The information processing device 100 stores changing the transmission destination of the query and transmitting the query from a container that is a transmission destination before being changed to a container that is a changed transmission destination, in the query information management table 700 and manages that. In the following description, there is a case where to transmit a query to the container that is the changed transmission destination is referred to as "evacuation". The information processing device 100 stores the table group to be the access unit of the query and the container that is the changed transmission destination in association with each other in the query information management table 700 so as to manage the table group and the container.

The information processing device 100 stores generation of the new container to be the transmission destination of the query in the query information management table 700 and manages the generation. The information processing device 100 stores the table group to be the access unit of the query and the new container to be the transmission destination in association with each other, in the query information management table 700 and manages the table group and the new container. The information processing device 100 refers to the query information management table 700 and controls the communication control device 301 to transmit a new query to the information accumulation device 302 that implements a container corresponding to the query. For example, the information processing device 100 is a server, a personal computer (PC), or the like.

The communication control device 301 is a computer that transmits a query to the information accumulation device 302. The communication control device 301 receives a query using one table group as an access unit, from the client device 303. The communication control device 301 transmits the received query to the information accumulation device 302 that implements a container corresponding to the table group to be the access unit of the received query, under the control of the information processing device 100. For example, the communication control device 301 is a server, a PC, or the like.

The information accumulation device 302 is a computer that implements a container having a table constellation. The information accumulation device 302 may generate a new container by the own device, under the control of the information processing device 100. The information accumulation device 302 may delete an existing container that is executed by the own device, under the control of the information processing device 100. The information accumulation device 302 receives the query using the table group included in the table constellation of the own device as the access unit, from the communication control device 301. The information accumulation device 302 generates a response to the query, in response to the reception of the query using the table group included in the table constellation of the own device as the access unit and transmits the response to the communication control device 301. For example, the information accumulation device 302 is a server, a PC, or the like.

The client device 303 is a computer that transmits a query to the communication control device 301. For example, the client device 303 generates a query using one table group as the access unit based on a user's operation input and transmits the query to the communication control device 301. The client device 303 receives a response to the transmitted query, from the communication control device 301. The client device 303 may implement a service by referring to a table of the information accumulation device 302, for example. For example, the client device 303 is a server, a PC, a tablet terminal, a smartphone, or the like.

Here, a case has been described where the information processing device 100 is a device different from the communication control device 301. However, the embodiment is not limited to this. For example, there may be a case where the information processing device 100 has the function as the communication control device 301 and operates as the communication control device 301.

Here, a case has been described where the information processing device 100 is a device different from the information accumulation device 302. However, the embodiment is not limited to this. For example, there may be a case where the information processing device 100 has the function as the information accumulation device 302 and operates as the information accumulation device 302.

Here, a case has been described where the information processing device 100 is a device different from the client device 303. However, the embodiment is not limited to this. For example, there may be a case where the information processing device 100 has the function as the client device 303 and operates as the client device 303.

(Specific Example of Information Processing System 300)

Next, a specific example of the information processing system 300 illustrated in FIG. 3 will be described with reference to FIG. 4.

Figure 4:
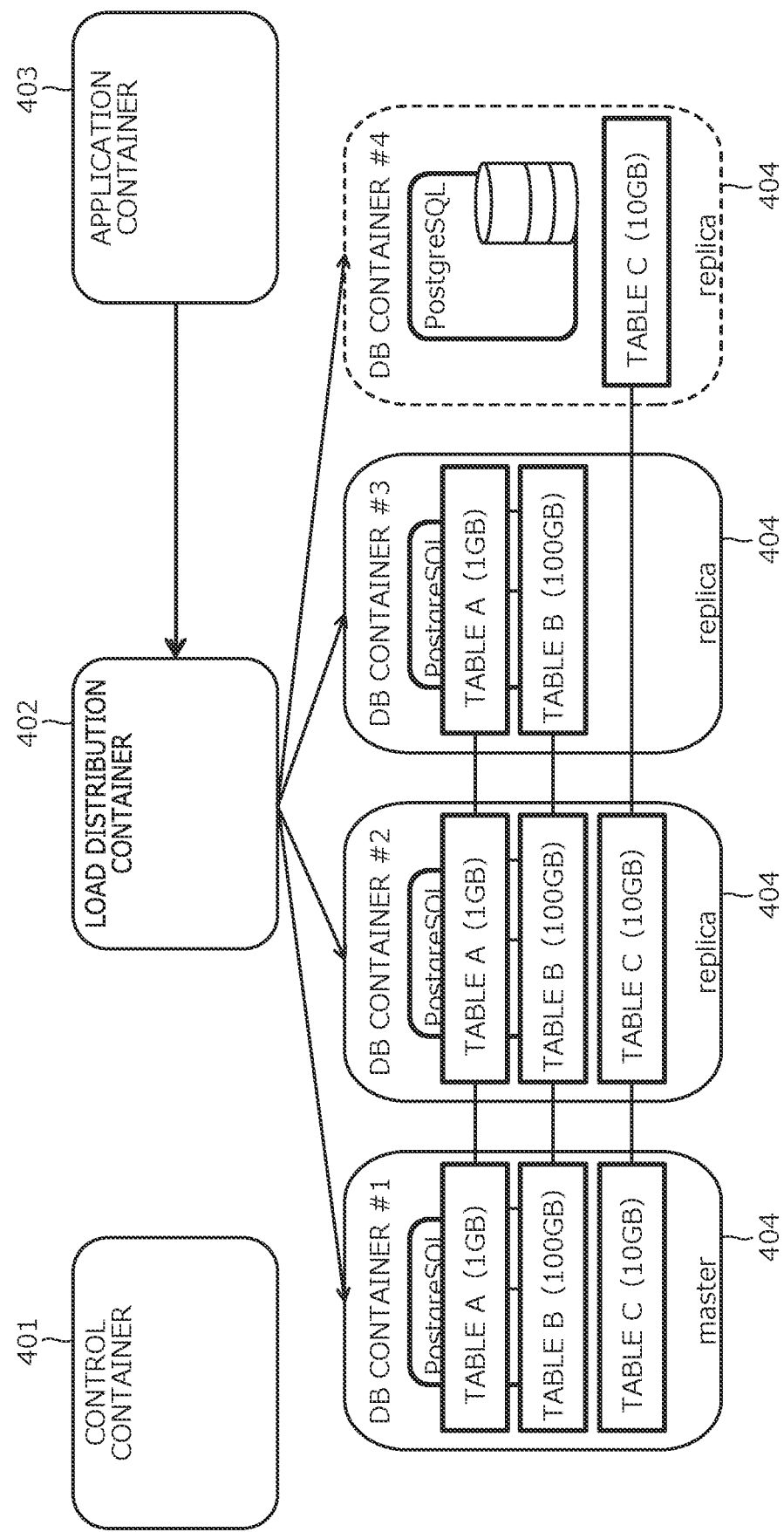
FIG. 4 is an explanatory diagram illustrating a specific example of the information processing system 300.

FIG. 4 is an explanatory diagram illustrating the specific example of the information processing system 300. In FIG. 4, the information processing system 300 includes a control container 401, a load distribution container 402, an application container 403, and a DB container 404. The information processing system 300 is implemented, for example, using Kubernetes (registered trademark).

The control container 401 is executed by the information processing device 100. For example, the control container 401 is a container used to implement the function as the information processing device 100 illustrated in FIG. 3. The load distribution container 402 is executed by the communication control device 301. For example, the load distribution container 402 is a container used to implement the function as the communication control device 301 illustrated in FIG. 3.

The application container 403 is executed by the client device 303. For example, the application container 403 is a container used to implement the function as the client device 303 illustrated in FIG. 3. The application container 403 may implement a service, for example, using the DB container 404.

The DB container 404 is executed by the information accumulation device 302. For example, the DB container 404 is a container used to implement the function as the information accumulation device 302 illustrated in FIG. 3. The DB container 404 is implemented, for example, using postgre sql (registered trademark). The Replica DB container 404 in FIG. 4 indicates a replica of a Master DB container 404 in FIG. 4.

(Usage Example of Information Processing System 300)

Next, a usage example of the information processing system 300 illustrated in FIG. 3 will be described. The information processing system 300 realizes, for example, an EC shop. For example, the application container 403 realizes the EC shop. For example, the application container 403 attempts to access data managed by the DB container 404, in order to realize the EC shop. For example, the application container 403 realizes the EC shop and provides a service of the EC shop to a service user.

For example, the EC shop provides a service for selling products or selling tickets. According to the information processing system 300, it is possible to suppress performance deterioration of the service at the time of access concentration on the EC shop. According to the information processing system 300, it is possible to suppress a decrease in a response speed from a service provider to a service user, for example, at the time of access concentration on the EC shop. According to the information processing system 300, it is possible to suppress an increase in an operation cost of the EC shop.

(Hardware Configuration Example of Information Processing Device 100)

Next, a hardware configuration example of the information processing device 100 will be described with reference to FIG. 5.

Figure 5:
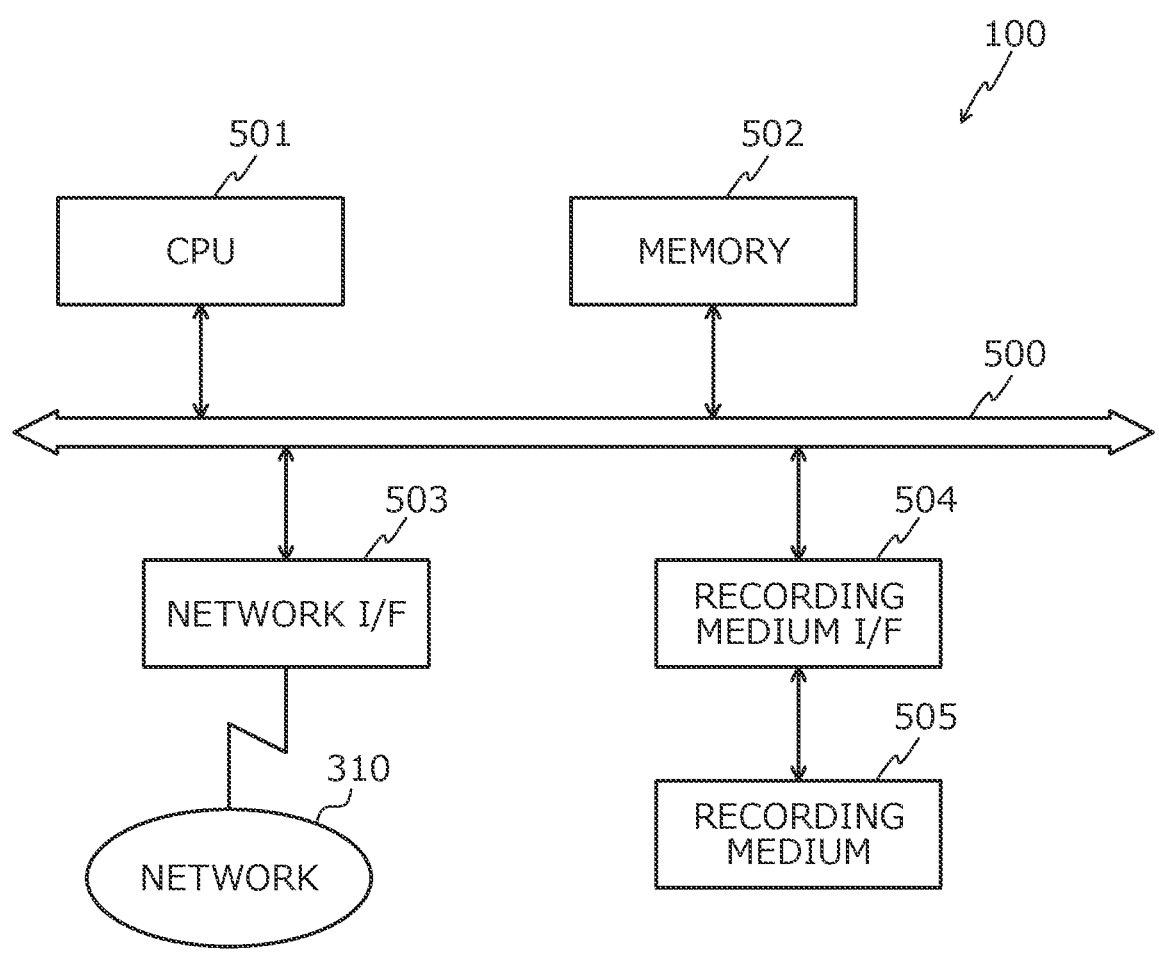
FIG. 5 is a block diagram illustrating a hardware configuration example of an information processing device 100.

FIG. 5 is a block diagram illustrating the hardware configuration example of the information processing device 100. In FIG. 5, the information processing device 100 includes a central processing unit (CPU) 501, a memory 502, a network interface (I/F) 503, a recording medium I/F 504, and a recording medium 505. Furthermore, the individual components are coupled to each other with a bus 500.

Here, the CPU 501 performs overall control of the information processing device 100. The memory 502 includes, for example, a read only memory (ROM), a random access memory (RAM), a flash ROM, or the like. For example, the flash ROM or the ROM stores various programs, while the RAM is used as a work area for the CPU 501. The programs stored in the memory 502 are loaded into the CPU 501 to cause the CPU 501 to execute coded processing.

The network I/F 503 is coupled to the network 310 through a communication line and is coupled to another computer via the network 310. Then, the network I/F 503 manages an interface between the network 310 and the inside and controls input/output of data to/from another computer. For example, the network I/F 503 is a modem, a LAN adapter, or the like.

The recording medium I/F 504 controls reading and writing of data from and to the recording medium 505 under the control of the CPU 501. The recording medium I/F 504 is, for example, a disk drive, a solid state drive (SSD), a universal serial bus (USB) port, or the like. The recording medium 505 is a nonvolatile memory that stores data written under the control of the recording medium I/F 504. The recording medium 505 is, for example, a disk, a semiconductor memory, a USB memory, or the like. The recording medium 505 may be attachable to and detachable from the information processing device 100.

For example, the information processing device 100 may include a keyboard, a mouse, a display, a printer, a scanner, a microphone, a speaker, or the like, as well as the components described above. Furthermore, the information processing device 100 may include a plurality of the recording medium I/Fs 504 and the recording media 505. Furthermore, the information processing device 100 does not have to include the recording medium I/F 504 or the recording medium 505.

(Storage Content of Statistical Information Management Table 600)

Next, an example of storage content of the statistical information management table 600 will be described with reference to FIG. 6. The statistical information management table 600 is implemented by a storage area such as the memory 502 or the recording medium 505 of the information processing device 100 illustrated in FIG. 5, for example.

FIG. 6 is an explanatory diagram illustrating an example of the storage content of the statistical information management table 600. As illustrated in FIG. 6, the statistical information management table 600 includes fields of an id, query content, the number of executions, a minimum time, a maximum time, an average time, a population standard deviation, the total number of shared blocks, and the total number of caches. In the statistical information management table 600, by setting information to each field for each type of a query, the statistical information is stores as a record 600-$a$. For example, a is an arbitrary integer.

In the field of the id, an id indicating a type of a query is set. The type indicates which table group is used as an access unit of a query. In the field of the query content, content on the query described above is set. The content of the query indicates a table group to be the access unit of the query in a specifiable manner. In the field of the number of executions, the number of executions performed after receiving the above type of query is set.

In the field of the minimum time, a minimum time of time required for processing the above type of query is set. In the field of the maximum time, a maximum time of time required for processing the above type of query is set. In the field of the average time, an average time of time required for processing the above type of query is set. In the field of the population standard deviation, a population standard deviation of time required for processing the above type of query is set.

In the field of the total number of shared blocks, the total number of shared blocks read in the processing of the above type of query is set. In the field of the total number of caches, the total number of caches of the shared block hit in the processing of the above type of query is set. The statistical information management table 600 is prepared for each container, for example. The statistical information management table 600 may collectively store and manage the statistical information regarding the plurality of containers.

(Storage Content of Query Information Management Table 700)

Next, with reference to FIG. 7, an example of storage content of the query information management table 700 will be described. The query information management table 700 is implemented by a storage area such as the memory 502 or the recording medium 505 of the information processing device 100 illustrated in FIG. 5, for example.

Figure 7:
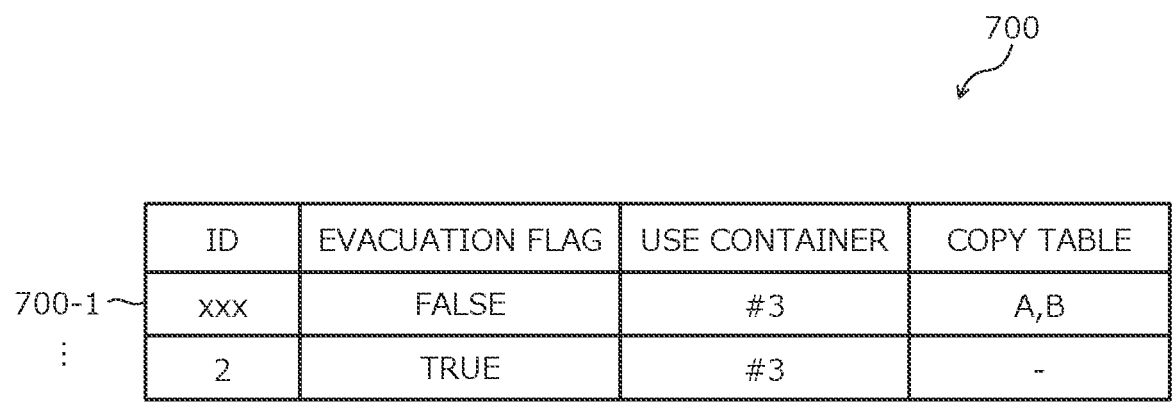
FIG. 7 is an explanatory diagram illustrating an example of storage content of a query information management table 700.

FIG. 7 is an explanatory diagram illustrating an example of the storage content of the query information management table 700. As illustrated in FIG. 7, the query information management table 700 includes fields of an id, an evacuation flag, a use container, and a copy table. In the query information management table 700, by setting information to each field for each type of a query, query information is stored as a record 700-$b$. For example, b is an arbitrary integer.

In the field of the id, an id indicating a type of a query is set. The type indicates which table group is used as an access unit of a query. The value id=xxx is a special value and is set to a record for storing container information that indicates a type of a table included in a container, instead of the query information.

In the field of the evacuation flag, an evacuation flag is set that indicates whether or not the record indicates a transmission destination in a case where the above type of query is evacuated or indicates a transmission destination in a case where the above type of query is transmitted to a new container. The evacuation flag=false represents that the record indicates the transmission destination in a case where the above type of query is transmitted to the new container. The evacuation flag=true represents that the record indicates the transmission destination in a case where the above type of query is evacuated.

In the field of the use container, identification information used to identify a container to be the transmission destination of the above type of query is set. In the field of the copy table, container information indicating a type of a table included in the container described above is set.

(Hardware Configuration Example of Communication Control Device 301)

For example, since a hardware configuration example of the communication control device 301 is similar to the hardware configuration example of the information processing device 100 illustrated in FIG. 5, description thereof is omitted.

(Hardware Configuration Example of Information Accumulation Device 302)

For example, since a hardware configuration example of the information accumulation device 302 is similar to the hardware configuration example of the information processing device 100 illustrated in FIG. 5, description thereof is omitted.

(Hardware Configuration Example of Client Device 303)

For example, since a hardware configuration example of the client device 303 is similar to the hardware configuration example of the information processing device 100 illustrated in FIG. 5, description thereof is omitted.

(Functional Configuration Example of Information Processing Device 100)

Next, a functional configuration example of the information processing device 100 will be described with reference to FIG. 8.

Figure 8:
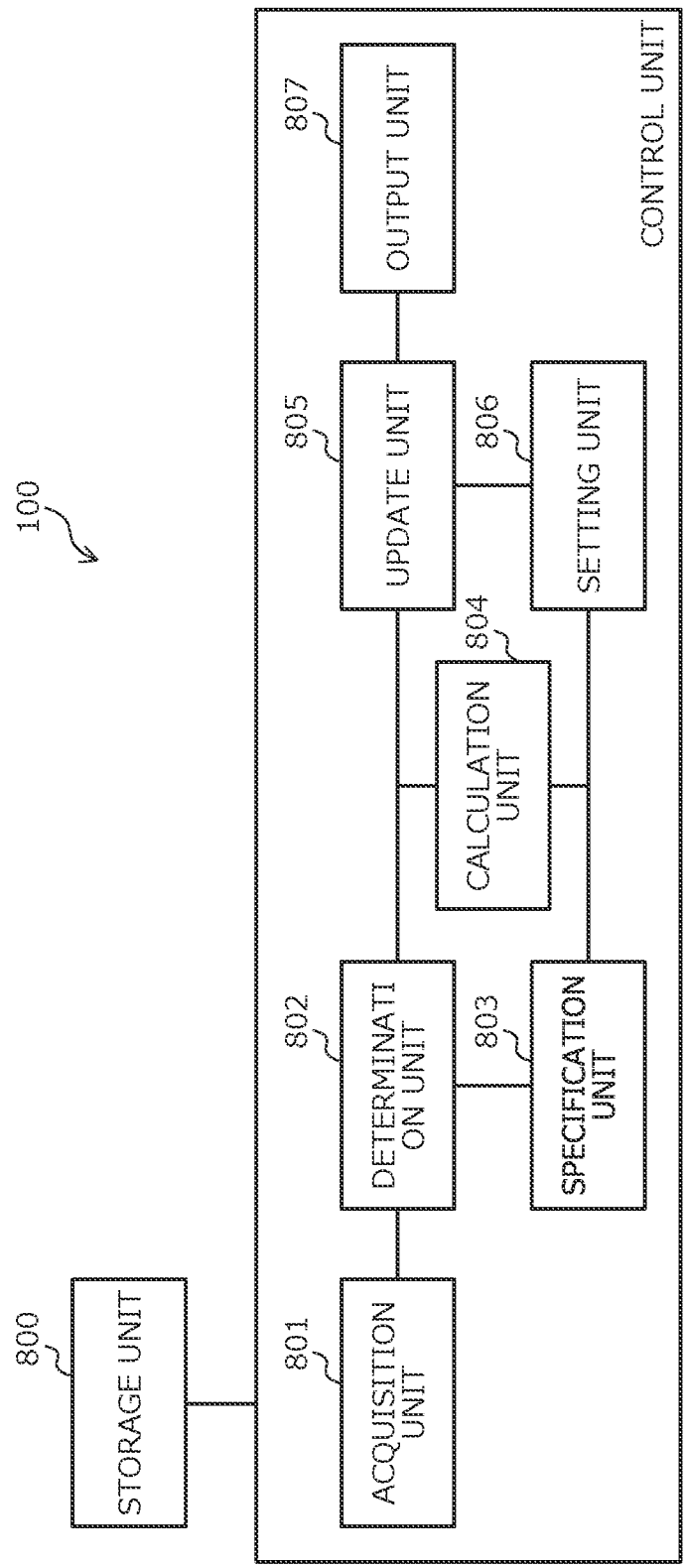
FIG. 8 is a block diagram illustrating a functional configuration example of the information processing device 100.

FIG. 8 is a block diagram illustrating the functional configuration example of the information processing device 100. The information processing device 100 includes a storage unit 800, an acquisition unit 801, a determination unit 802, a specification unit 803, a calculation unit 804, an update unit 805, a setting unit 806, and an output unit 807.

The storage unit 800 is implemented by, for example, a storage area such as the memory 502 or the recording medium 505 illustrated in FIG. 5. Hereinafter, a case where the storage unit 800 is included in the information processing device 100 will be described. However, the embodiment is not limited to this. For example, there may be a case where the storage unit 800 is included in a device different from the information processing device 100, and the content stored in the storage unit 800 can be referred to from the information processing device 100.

The acquisition unit 801 to the output unit 807 function as an example of a control unit. The acquisition unit 801 to the output unit 807 implement functions thereof by, for example, causing the CPU 501 to execute a program stored in the storage area such as the memory 502 or the recording medium 505 or by the network I/F 503 illustrated in FIG. 5. A processing result of each functional unit is stored in, for example, the storage area such as the memory 502 or the recording medium 505 illustrated in FIG. 5.

The storage unit 800 stores various types of information to be referred to or updated in the processing of each functional unit. For example, the storage unit 800 stores the statistical information that indicates the statistical value regarding the processing load of the query, for each data group to be the access unit of the query, in the data constellation of the execution environment, for at least any one of the plurality of execution environments. The plurality of execution environments has, for example, different data constellations. The execution environment is, for example, a container, a virtual machine, or the like.

The data is, for example, a DB, a table, or the like. The plurality of execution environments may include, for example, two or more execution environments having the same data constellation. The data group is, for example, a single piece of data or a combination of two or more pieces of data. The query is, for example, an inquiry for requesting an access to data. For example, the query is an inquiry for requesting an access to data and requesting to return a response including the data itself or partial data included in the data. The partial data is, for example, a record of a table.

The statistical value includes, for example, an average time, a minimum time, a maximum time, or the like of a query processing time. The statistical value includes, for example, a population standard deviation regarding the query processing time, or the like. The statistical value includes, for example, the number of times when a query is received. For example, for each execution environment, the storage unit 800 stores the statistical information indicating the statistical value regarding the processing load of the query, for each data group to be the access unit of the query, in the data constellation included in the execution environment. For example, the storage unit 800 stores the statistical information management table 600. The statistical information is acquired by the acquisition unit 801, for example.

For at least any one of the plurality of execution environments, the storage unit 800 stores correspondence information in which identification information used to identify the execution environment and identification information used to identify each piece of data of a data constellation included in the execution environment are associated with each other. For example, for each execution environment, the storage unit 800 stores correspondence information in which the identification information used to identify the execution environment and the identification information used to identify each piece of data of the data constellation included in the execution environment are associated with each other. For example, the storage unit 800 stores the query information management table 700. The correspondence information is preset by a user, for example. The correspondence information may be generated by the update unit 805, for example.

For example, the storage unit 800 stores identification information used to identify an execution environment to be a transmission destination of a query using the data group as the access unit, from among the plurality of execution environments, for each data group to be the access unit. For example, the storage unit 800 stores the query information management table 700. The identification information is preset by a user, for example. For example, the identification information may be determined according to a predetermined rule. The rule defines, for example, a method for distributing a query into a plurality of execution environments. The identification information may be set by the setting unit 806, for example.

For example, the storage unit 800 may store identification information used to identify an execution environment to be a transmission destination of a query using one data group as an access unit and flag information indicating whether or not the execution environment is a transmission destination to which the query is evacuated in association with each other. For example, the storage unit 800 stores the query information management table 700. The flag information is set by the setting unit 806, for example.

For example, the storage unit 800 may store the identification information used to identify the execution environment to be the transmission destination of the query using one data group as the access unit and the flag information indicating whether or not the execution environment is an execution environment added as a transmission destination to which the query is transmitted. For example, the storage unit 800 stores the query information management table 700. The flag information is set by the setting unit 806, for example.

The acquisition unit 801 acquires various types of information to be used for the processing of each functional unit. The acquisition unit 801 stores the acquired various types of information in the storage unit 800 or outputs the acquired information to each functional unit. Furthermore, the acquisition unit 801 may output the various types of information stored in the storage unit 800 to each functional unit. The acquisition unit 801 acquires the various types of information based on, for example, the user's operation input. The acquisition unit 801 may receive the various types of information from a device different from the information processing device 100, for example.

The acquisition unit 801 acquires, for example, the statistical information. For example, the acquisition unit 801 acquires the statistical information by receiving input of the statistical information, based on a user's operation input. The acquisition unit 801 acquires the statistical information by receiving the statistical information from another computer, for example. For example, the acquisition unit 801 acquires the statistical information by acquiring measurement information to be a source of the statistical information and executing statistical processing on the acquired measurement information. The measurement information is, for example, a query processing time or the like.

For example, the acquisition unit 801 may acquire a measurement value regarding the processing load of the execution environment, for at least any one of the plurality of execution environments at the current time point. For example, the measurement value is a CPU usage rate, a memory usage rate, or the like.

The acquisition unit 801 may accept a start trigger to start the processing of any one of the functional units. The start trigger is, for example, a predetermined operation input made by the user. The start trigger may be, for example, reception of predetermined information from another computer. The start trigger may be, for example, output of predetermined information by any one of the functional units. The start trigger may be, for example, detection of a signal that is periodically sent by a timer. For example, the acquisition unit 801 receives start triggers to start processing of the determination unit 802, the specification unit 803, the calculation unit 804, the update unit 805, and the setting unit 806.

The determination unit 802 selects the first execution environment to be processed. For example, the determination unit 802 selects each execution environment as the first execution environment to be processed. As a result, the determination unit 802 can reduce a processing load of each execution environment.

For example, the determination unit 802 may select an execution environment having a data constellation including a data group of which a processing load by a query is less than a predetermined reference value, as the first execution environment to be processed, based on the statistical information stored in the storage unit 800. The predetermined reference value is preset by a user, for example. As a result, the determination unit 802 can reduce the processing load of each functional unit.

For example, the determination unit 802 may select an execution environment of which a measurement value regarding a processing load is larger than other execution environments, as the first execution environment to be processed, based on the measurement value regarding the processing load of each of the plurality of execution environments at the current time point. As a result, the determination unit 802 can reduce the processing load of each functional unit.

The determination unit 802 specifies the first data group. For example, the first data group is information that enables to specify a query to be an evacuation candidate, in order to reduce the processing load of the execution environment.

For example, the determination unit 802 determines the first data group of which the processing load of the query is less than the first reference value, in the first data constellation included in the first execution environment, based on the statistical information stored in the storage unit 800. The first reference value is preset by a user, for example.

For example, the determination unit 802 specifies the first data group of which a population standard deviation is less than the first reference value, in the first data constellation included in the first execution environment. As a result, the determination unit 802 can enable to specify a query, of which a processing load is relatively small, to be the evacuation candidate.

For example, the determination unit 802 specifies the first data group of which the processing load of the query is less than the first reference value and an index value regarding the number of times when the query is received is equal to or more than a predetermined value, in the first data constellation, based on the statistical information stored in the storage unit 800. The index value is, for example, the number of times. The index value may be, for example, a distribution of the number of times. The predetermined value is preset by a user, for example.

For example, the determination unit 802 specifies the first data group of which the population standard deviation is less than the first reference value and the number of times when the query is received is equal to or more than the predetermined value, in the first data constellation included in the first execution environment. As a result, the determination unit 802 can enable to specify a query, of which a processing load is relatively small, to be the evacuation candidate. Furthermore, although the processing load is relatively small, the index value regarding the number of times is relatively large. Therefore, the determination unit 802 can specify the query that is expected to have a relatively high reduction effect of the processing load of the execution environment caused by evacuation.

The determination unit 802 specifies a second data group. For example, the second data group is information that enables to specify a query to be transmitted to a new execution environment to be generated thereafter, in order to reduce the processing load of the execution environment. The selection of the first execution environment and the specification of the second data group may be performed at the same time.

For example, the determination unit 802 determines the second data group of which the processing load of the query is equal to or more than a second reference value, in the first data constellation included in the first execution environment, based on the statistical information stored in the storage unit 800. The second reference value is preset by a user, for example. For example, the second reference value may be the same as the first reference value or may be different from the first reference value. For example, the second reference value is the same as the predetermined reference value.

For example, the determination unit 802 specifies the second data group of which a population standard deviation is equal to or more than the second reference value, in the first data constellation included in the first execution environment. As a result, the determination unit 802 can enable to specify a query, of which a processing load is relatively large, to be a candidate to be transmitted to the new execution environment to be generated thereafter.

For example, the determination unit 802 determines whether or not the processing load of the query is less than a third reference value, for the specified second data group, in the first data constellation included in the first execution environment, based on the statistical information stored in the storage unit 800. The third reference value is preset by a user, for example. For example, the third reference value may be the same as the first reference value or may be different from the first reference value. For example, the third reference value may be the same as the second reference value or may be different from the second reference value.

For example, the determination unit 802 determines whether or not the population standard deviation is less than the third reference value, for the specified second data group, in the first data constellation included in the first execution environment. As a result, the determination unit 802 can determine whether or not the generated new execution environment that is a transmission destination of the query using the second data group as the access unit may be currently deleted. For example, the determination unit 802 determines that the generated new execution environment that is the transmission destination of the query using the second data group as the access unit may be deleted if the population standard deviation falls below the third reference value, for the second data group.

The determination unit 802 may specify the first data group after specifying the second data group. For example, the determination unit 802 specifies the first data group of which the processing load of the query is less than the first reference value, in the first data constellation, based on the statistical information, in response to that the second data group is specified. As a result, the determination unit 802 can specify the first data group only in a situation in which a query having a relatively large processing load exists and it is preferable to reduce the processing load of the execution environment and can reduce the processing load of each functional unit.

For example, the determination unit 802 specifies the first data group of which the processing load of the query is less than the first reference value, in the first data constellation, other than the second data group, based on the statistical information. As a result, the determination unit 802 can prevent the second data group and the first data group from overlapping each other and can prevent occurrence of an error when the processing load of the execution environment is reduced.

The specification unit 803 specifies the second execution environment having the second data constellation including the specified first data group, included in the plurality of execution environments. The second execution environment is, for example, an execution environment different from the first execution environment. As a result, the specification unit 803 can specify an execution environment to be a query evacuation candidate.

For example, the specification unit 803 specifies the second execution environment, included in the plurality of execution environments, having the second data constellation that includes the specified first data group and does not include at least any one piece of data other than the specified first data group, in the first data constellation. As a result, the specification unit 803 can specify an execution environment to be a query evacuation candidate. The specification unit 803 can specify an execution environment in which the processing load is expected to be relatively small after evacuating the query. Therefore, the specification unit 803 can prevent an increase of the processing load of the execution environment to be evacuated from being equal to or more than a certain level.

For example, the specification unit 803 specifies the second execution environment that has a data constellation including the first data group and has a smaller measurement value regarding a processing load than the other execution environments, included in the plurality of execution environments, based on the measurement value regarding the processing load of each of the plurality of execution environments at the current time point. As a result, the specification unit 803 can specify an execution environment to be a query evacuation candidate. The specification unit 803 can specify an execution environment in which the processing load is expected to be relatively small after evacuating the query. Therefore, the specification unit 803 can prevent an increase of the processing load of the execution environment to be evacuated from being equal to or more than a certain level.

The calculation unit 804 calculates a first index value indicating a magnitude of a reduction effect on the processing load of the query in a case where the new query using the specified first data group as the access unit is transmitted to the searched second execution environment. As a result, the calculation unit 804 can determine whether or not it is preferable to evacuate the query. For example, the calculation unit 804 can determine which is preferable to evacuate the query or to generate a new execution environment where the query is transmitted.

The calculation unit 804 calculates a second index value indicating a magnitude of a reduction effect on the processing load of the query in a case where a new query using the specified second data group as the access unit is transmitted to an added third execution environment. As a result, the calculation unit 804 can determine whether or not it is preferable to generate the new execution environment where the query is transmitted. For example, the calculation unit 804 can determine which is preferable to evacuate the query or to generate a new execution environment where the query is transmitted.

The update unit 805 controls the plurality of execution environments. For example, the update unit 805 controls the plurality of execution environments to generate a new execution environment different from the plurality of execution environments and add the new execution environment to the plurality of execution environments. For example, the update unit 805 controls the information accumulation device 302 to generate the new execution environment different from the plurality of execution environments and add the new execution environment to the plurality of execution environments.

For example, the update unit 805 generates a new third execution environment having a third data constellation that includes the specified second data group and does not include at least any one piece of the first data constellation and adds the third execution environment to the plurality of execution environments. As a result, the update unit 805 can prepare a new execution environment to be a new transmission destination of the query using the second data group as the access unit. The update unit 805 can transmit the query using the second data group as the access unit to another transmission destination different from the current transmission destination. The update unit 805 can reduce a processing load of an execution environment that is the current transmission destination.

For example, the update unit 805 controls the plurality of execution environments to delete any one execution environment from the plurality of execution environments. The execution environment to be deleted is, for example, an execution environment that has been generated in the past under the control of the update unit 805. For example, the update unit 805 controls the information accumulation device 302 to delete any one execution environment from the plurality of execution environments.

For example, in a case where the determination unit 802 determines that the processing load of the query falls below the third reference value, for the second data group, the update unit 805 deletes the third execution environment that has been added in the past, from the plurality of execution environments. As a result, the update unit 805 can reduce an operation cost of the plurality of execution environments. For example, the update unit 805 can reduce the operation cost of the plurality of execution environments, within a range in which the processing load of the execution environment is not equal to or more than a certain value.

The setting unit 806 controls a transmission destination of a query. For example, the setting unit 806 controls the plurality of execution environments to transmit the new query using the specified first data group as the access unit to the specified second execution environment. For example, the setting unit 806 controls the communication control device 301 to transmit the new query using the specified first data group as the access unit to the specified second execution environment. For example, when receiving the new query using the specified first data group as the access unit by the own device, the setting unit 806 may transmit the received new query to the specified second execution environment from the own device. As a result, the setting unit 806 can evacuate the query and reduce the processing load of any one of the execution environments.

For example, in a case where the calculated first index value is larger than the calculated second index value by a value equal to or more than a certain value, the setting unit 806 may control the plurality of execution environments to transmit the new query using the specified first data group as the access unit to the specified second execution environment. As a result, in a case where evacuating the query is more preferable than transmitting the query to the new execution environment, the setting unit 806 can evacuate the query and can efficiently reduce the processing load of any one of the execution environments.

For example, the setting unit 806 controls the plurality of execution environments to transmit the new query using the specified second data group as the access unit to the added third execution environment. For example, the setting unit 806 controls the communication control device 301 to transmit the new query using the specified second data group as the access unit to the added third execution environment. For example, when receiving the new query using the specified second data group as the access unit by the own device, the setting unit 806 may transmit the received new query to the added third execution environment. As a result, the setting unit 806 can transmit the query to the new execution environment and reduce the processing load of any one of the execution environments.

For example, in a case where the calculated first index value is not larger than the calculated second index value by the value equal to or more than the certain value, the setting unit 806 controls the plurality of execution environments to transmit the new query using the specified second data group as the access unit to the added third execution environment. As a result, in a case where transmitting the query to the new execution environment is more preferable than evacuating the query, the setting unit 806 can transmit the query to the new execution environment and efficiently reduce the processing load of any one of the execution environments.

For example, the setting unit 806 controls the plurality of execution environments to transmit the new query using the specified second data group as the access unit to a fourth execution environment having a fourth data constellation including the specified second data group, among the plurality of execution environments. For example, the setting unit 806 controls the plurality of execution environments to transmit the new query using the second data group as the access unit to the fourth execution environment, among the plurality of execution environments, after deleting the third execution environment.

The fourth execution environment is an execution environment that has been the transmission destination of the query using the second data group as the access unit, for example, before the third execution environment is generated. For example, before generating the third execution environment, the fourth execution environment may be an execution environment other than the execution environment that has been the transmission destination of the query using the second data group as the access unit.

For example, the setting unit 806 controls the communication control device 301 to transmit the new query using the second data group as the access unit to the fourth execution environment, among the plurality of execution environments, after deleting the third execution environment. For example, when receiving the new query using the specified second data group as the access unit by the own device, the setting unit 806 may transmit the received new query to the fourth execution environment from the own device. As a result, the setting unit 806 can appropriately transmit the query using the second data group as the access unit to any one of execution environments, after deleting the third execution environment.

The output unit 807 outputs a processing result of at least any one of the functional units. The output format is, for example, display on a display, print output to a printer, transmission to an external device by the network I/F 503, or storage in a storage area such as the memory 502 or the recording medium 505. As a result, the output unit 807 may make it possible to notify a user of the processing result of at least any one of the functional units, and may achieve improvement in convenience of the information processing device 100.

The output unit 807 may output, for example, that the update unit 805 has generated a new execution environment. For example, the output unit 807 outputs that the update unit 805 has generated a new execution environment so that a user can refer to. As a result, the output unit 807 can enable the user to grasp states of the plurality of execution environments.

For example, the output unit 807 outputs that the update unit 805 has deleted any one of the execution environments. For example, the output unit 807 outputs that the update unit 805 has deleted any one of the execution environments so that the user can refer to. As a result, the output unit 807 can enable the user to grasp states of the plurality of execution environments.

For example, the output unit 807 outputs that the setting unit 806 has changed a transmission destination of a query. For example, the output unit 807 outputs that the setting unit 806 has changed the transmission destination of the query so that the user can refer to. As a result, the output unit 807 can enable the user to grasp how to handle the query.

(Operation Example of Information Processing Device 100)

Next, an operation example of the information processing device 100 will be described with reference to FIGS. 9 to 18. In the examples in FIGS. 9 to 18, it is assumed that a container #1, a container #2, and a container #3 exist. For example, it is assumed that the container #1 include a table A, a table B, and a table C. For example, it is assumed that the container #2 include the table A, the table B, and the table C. For example, it is assumed that the container #3 include the table A and the table B.

It is assumed that the size of the table A be, for example, 1 GigaByte (GB). It is assumed that the size of the table B be, for example, 100 GB. It is assumed that the size of the table C be, for example, 10 GB. In the following description, a case will be described where the information processing device 100 selects the container #1 as a processing target of which a processing load is reduced.

First, with reference to FIG. 9, an example will be described in which the information processing device 100 specifies a query, of which a processing load is relatively large, to be a candidate to be transmitted to a new container to be added. In the following description, there is a case where the query of which the processing load is relatively large is referred to as a "high-load query".

FIG. 9 is an explanatory diagram illustrating an example of specifying a high-load query. In FIG. 9, the information processing device 100 includes the statistical information management table 600 regarding the container #1. The information processing device 100 stores the size "1 GB" of the table A, the size "100 GB" of the table B, and the size "10 GB" of the table C.

The information processing device 100 refers to the statistical information management table 600, specifies a record of which a population standard deviation is equal to or more than a first threshold, and specifies a combination of an id and query content included in the specified record. The first threshold is preset by a user, for example. The first threshold is, for example, five. The information processing device 100 specifies a query with the specified id as a high-load query. The information processing device 100 specifies a table group indicated by the specified query content as a table group to be an access unit of the high-load query.

In the example in FIG. 9, the information processing device 100 specifies a record 600-3 of which a population standard deviation is equal to or more than five, and specifies a combination of an id "3" and query content "select*from C;" included in the specified record 600-3. The information processing device 100 specifies the query with the specified id "3" as a high-load query. The information processing device 100 specifies a table group "table C" indicating the specified query content "select*from C;" as a table group to be an access unit of the high-load query.

As a result, the information processing device 100 can specify a query corresponding to which id may be set as a candidate to be transmitted to a new container to be added, as the high-load query. Furthermore, the information processing device 100 can specify which table group included in the new container to be added makes it possible to transmit the high-load query.

Next, with reference to FIG. 10, an example will be described in which the information processing device 100 calculates an evaluation value of scale-out. The scale-out is, for example, processing of adding a new container. The plurality of new containers to be added may exists. The evaluation value of the scale-out is an index value indicating a magnitude of a reduction effect on a processing load of an existing container that is a transmission destination of the high-load query at the current time point, in a case where scale-out is performed and the high-load query is transmitted to the added new container. The existing container is, for example, the container #1.

Figure 10:
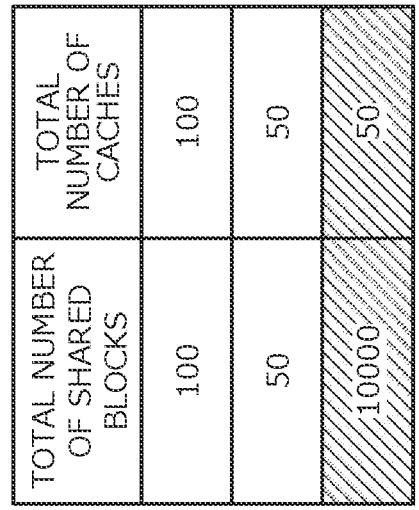
FIG. 10 is an explanatory diagram illustrating an example of calculating an evaluation value of scale-out.

FIG. 10 is an explanatory diagram illustrating an example of calculating an evaluation value of scale-out. In FIG. 10, the information processing device 100 calculates the evaluation value of the scale-out. For example, the information processing device 100 calculates the evaluation value of the scale-out using an evaluation function in the following formula (1).

$$\text{Evaluation value (time)} = \text{SUM (time required to transfer table group to be access unit of high-load query between execution environments)} + \text{estimated value of response time of high-load query} \quad (1)$$

SUM (time required to transfer table group to be access unit of high-load query between execution environments) is defined, for example, by a size/a network speed of the table group. The network speed is acquired by ping, for example. The size of the table group "table C" is the size of the table C "10 GB".

The estimated value of the response time of the high-load query is defined by, for example, the average time/the number of containers including the table group to be the access unit of the high-load query. The average time is, for example, an average time "10,000 seconds" of the specified record 600-3. The number of containers is the number of containers included in one or more containers having the table group to be the access unit of the high-load query, including a container to be added thereafter.

As a result, the information processing device 100 can evaluate a magnitude of a reduction effect of a processing load of an existing container that is the transmission destination of the high-load query at the current time point, in a case where the high-load query is transmitted to the added new container. The existing container is, for example, the container #1. The information processing device 100 performs scale-out and can determine whether or not to control the information processing system 300 to transmit the high-load query to the added new container.

Next, with reference to FIG. 11, an example will be described in which the information processing device 100 specifies a query, of which a processing load is relatively small, to be an evacuation candidate and calculates an evaluation value of evacuation. In the following description, there is a case where the query of which the processing load is relatively small is referred to as a "low-load query". The evaluation value of the evacuation is an index value indicating a magnitude of a reduction effect of a processing load of an existing container that is a transmission destination of the low-load query at the current time point, in a case where the low-load query is evacuated. The existing container is, for example, the container #1.

FIG. 11 is an explanatory diagram illustrating an example of calculating an evaluation value of evacuation. In FIG. 11, the information processing device 100 refers to the statistical information management table 600 and specifies a record of which at least a population standard deviation is less than a second threshold. The second threshold is preset by a user, for example. For example, the second threshold may be the same as the first threshold or may be different from the first threshold. The second threshold is, for example, five.

For example, the information processing device 100 specifies a record that has a population standard deviation less than the second threshold, uses a table group that does not overlap the table group to be the access unit of the high-load query as the access unit, and has an execution distribution equal to or more than a third threshold. The third threshold is preset by a user, for example. The third threshold is, for example, 0.1. The execution distribution is, for example, an index value regarding the number of executions. The execution distribution is, for example, a sum of the number of executions of the query/the number of executions of all queries.

In the example in FIG. 11, the information processing device 100 specifies a record 600-2 that has a population standard deviation less than five, uses a table group "table A and table B" that does not overlap a table group "table C" as the access unit, and has the number of executions equal to or more than 0.1. As a result, the information processing device 100 can specify a record regarding the low-load query.

The information processing device 100 specifies a combination of an id and query content included in the specified record. The information processing device 100 specifies a query with the specified id as the low-load query. The information processing device 100 specifies a table group indicated by the specified query content as a table group to be an access unit of the low-load query.

In the example in FIG. 11, the information processing device 100 specifies a combination of an id "2" and query content "select*from A join B using(id)where id=1;" included in the specified record 600-2.

The information processing device 100 specifies a query with the specified id "2" as the low-load query. The information processing device 100 specifies a table group "table A and table B" indicated by the specified query content "select*from A join B . . . " as the table group to be the access unit of the low-load query.

As a result, the information processing device 100 can specify a query corresponding to which id may be set as an evacuation candidate, as the low-load query. The information processing device 100 can specify a query that is expected to have a large reduction effect of the processing load of the existing container through the evacuation, as the low-load query, using the execution distribution. The existing container is, for example, the container #1. Furthermore, the information processing device 100 can specify a container having which table group can enable the low-load query to evacuate.

The information processing device 100 calculates an evaluation value of the evacuation. For example, the information processing device 100 calculates the evaluation value of the evacuation using an evaluation function in the following formula (2).

Evaluation value (time)=SUM (time required to transfer table group to be access unit of low-load query between execution environments)+ estimated value of response time of high-load query (2)

SUM (time required to transfer table group to be access unit of low-load query between execution environments) is defined, for example, by a size/a network speed of the table group. The network speed is acquired by ping, for example. The size of the table group "table A and table B" is a sum "101 GB" of the size of the table A "1 GB" and the size of the table B "100 GB".

The estimated value of the response time of the low-load query is defined, for example, by an average time*(sum of appearance rates of queries other than low-load query). The average time is, for example, an average time "10,000 seconds" of the record 600-3 corresponding to the high-load query. The sum of the appearance rates of queries other than the low-load query is, for example, a sum of an appearance rate of a query having an id "1" and an appearance rate of a high-load query having an id "3".

As a result, the information processing device 100 can evaluate the magnitude of the reduction effect of the processing load of the existing container that is the transmission destination of the low-load query at the current time point, in a case where the low-load query is evacuated. The information processing device 100 can determine whether or not to control the information processing system 300 to evacuate the low-load query.

Next, with reference to FIGS. 12 and 13, an example will be described in which, since the information processing device 100 determines to evacuate the low-load query, based on a result of comparing the evaluation value of the scale-out and the evaluation value of the evacuation, the information processing device 100 evacuates the low-load query.

Figure 12:
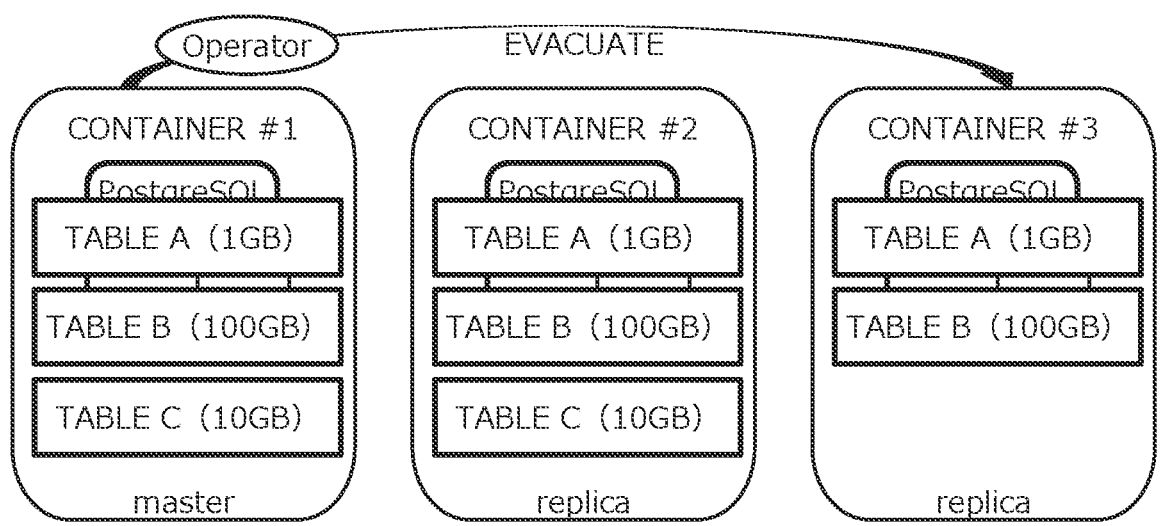
FIG. 12 is an explanatory diagram (part 1) illustrating an example in which evacuation is performed.
Figure 13:
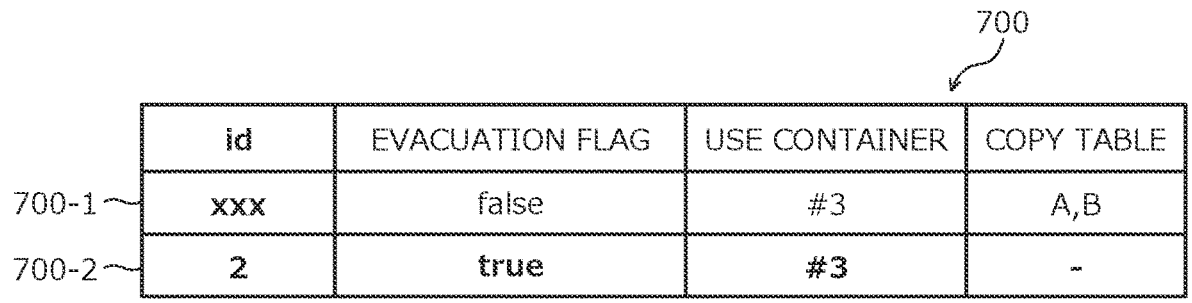
FIG. 13 is an explanatory diagram (part 2) illustrating an example in which evacuation is performed.

FIGS. 12 and 13 are explanatory diagrams illustrating an example in which evacuation is performed. In FIG. 12, if the evaluation value of the scale-out is less than the evaluation value of the evacuation, the information processing device 100 determines to evacuate the low-load query. In the example in FIG. 12, it is assumed that the information processing device 100 determine to evacuate the low-load query since the evaluation value of the scale-out is less than the evaluation value of the evacuation.

The information processing device 100 specifies a container where the low-load query is evacuated. For example, the information processing device 100 specifies a container that has a table constellation including at least a table group of the low-load query as the container where the low-load query is evacuated. As a result, the information processing device 100 can specify the evacuation destination of the low-load query and can evacuate the low-load query.

For example, the information processing device 100 may specify a container that has a table constellation that includes the table group of the low-load query and does not include any one table included in the existing container that is the current transmission destination of the low-load query, as the container where the low-load query is evacuated. The existing container is, for example, the container #1.

As a result, the information processing device 100 can specify the evacuation destination of the low-load query and can evacuate the low-load query. The information processing device 100 can specify a container that does not include any one table included in the existing container as the evacuation destination of the low-load container, and can prevent the processing load of the container to be the evacuation destination of the low-load query from being equal to or more than a certain value.

For example, the information processing device 100 may specify a container that has a table constellation including a table group of the low-load query and having a resource usage amount equal to or less than a fourth threshold, as the container where the low-load query is evacuated. The resource usage amount is, for example, a CPU usage rate, a memory usage rate, or the like.

As a result, the information processing device 100 can specify the evacuation destination of the low-load query and can evacuate the low-load query. The information processing device 100 can specify a container having a relatively small resource usage amount as the evacuation destination of the low-load container and can prevent the processing load of the container to be the evacuation destination of the low-load query from being equal to or more than a certain value.

In the example in FIG. 12, it is assumed that the information processing device 100 specify the container #3 that includes the table group "table A and table B" and does not include the table C as the evacuation destination of the low-load query. Next, description proceeds to FIG. 13.

In FIG. 13, the information processing device 100 stores a record 700-1 in which the container #3 is associated with the table group "table A and table B" included in the container #3 in the query information management table 700 and manages the record 700-1. The information processing device 100 stores a record 700-2 indicating that the container #3 is specified as an evacuation destination of a low-load query having an id "2" in the query information management table 700 and manages the record 700-2.

Returning to the description in FIG. 12, the information processing device 100 refers to the query information management table 700 and controls the communication control device 301 to transmit the low-load query having the id "2" to the container #3 thereafter. The communication control device 301 recognizes the container #3 as the transmission destination of the low-load query having the id "2", under the control of the information processing device 100.

In a case of receiving the low-load query having the id "2" from the client device 303 under the control of the information processing device 100, the communication control device 301 transmits the received low-load query having the id "2" to the container #3. For example, the communication control device 301 transmits the received low-load query having the id "2" to any one of one or more containers having the table group "table A and table B", including the container #3 so that the processing load is distributed.

As a result, the information processing device 100 can evacuate the low-load query to the container #3 and can reduce the processing load of the container #1. In order to reduce the processing load of the container #1, the information processing device 100 can increase a resource amount that can be used for a query other than the low-load query, in the container #1. For example, the information processing device 100 can increase a resource amount that can be used for the high-load query in the container #1 and can improve a processing performance regarding the high-load query.

Since the information processing device 100 does not perform scale-out and does not generate a new container, the information processing device 100 can relatively quickly reduce the processing load of the information processing system 300 and can suppress an increase in the operation cost of the information processing system 300. Since the information processing device 100 does not generate a new container, the information processing device 100 does not need to transfer a table and can reduce a processing load such as a network load of the information processing system 300 or the like.

Furthermore, by evacuating the low-load query to the container #3, the information processing device 100 can aggregate queries using the same table group as the access unit to the container #3. Therefore, the information processing device 100 can improve cache usage efficiency in the container #3 and can improve a performance of the query.

Next, with reference to FIGS. 14 and 15, an example will be described in which the information processing device 100 determines to transmit the high-load query to a new container to be added, based on the result of comparing the evaluation value of the scale-out and the evaluation value of the evacuation and performs scale-out.

Figure 14:
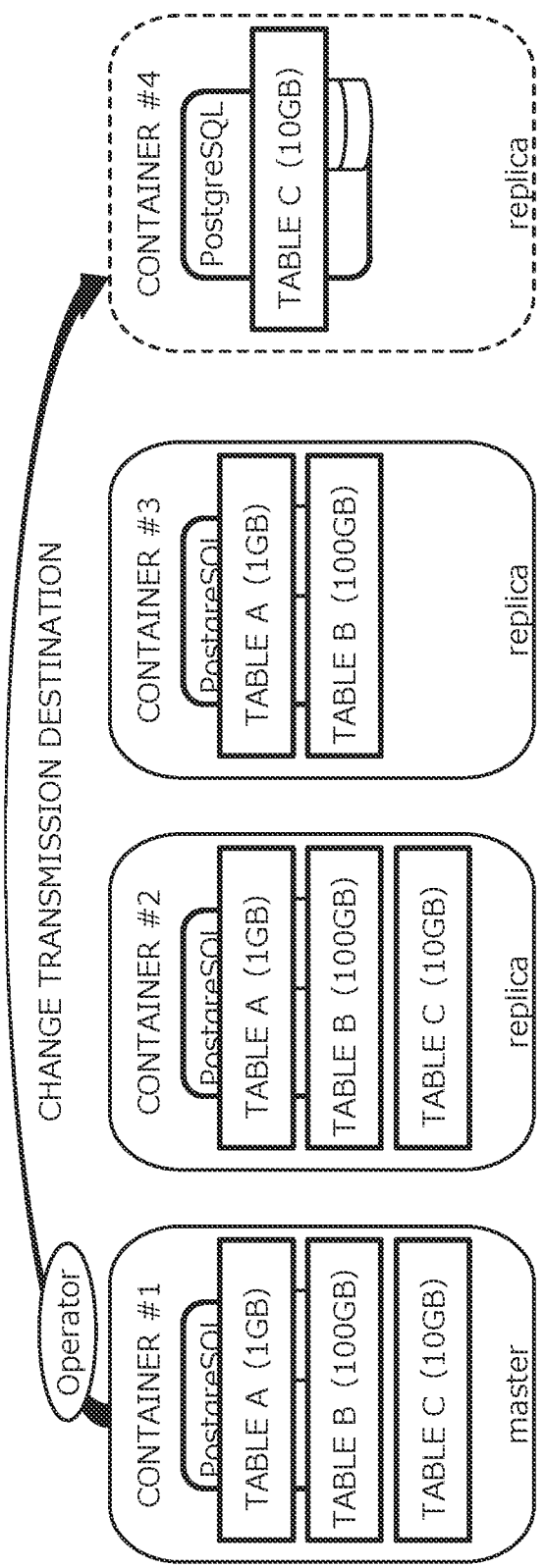
FIG. 14 is an explanatory diagram (part 1) illustrating an example in which scale-out is performed.
Figure 15:
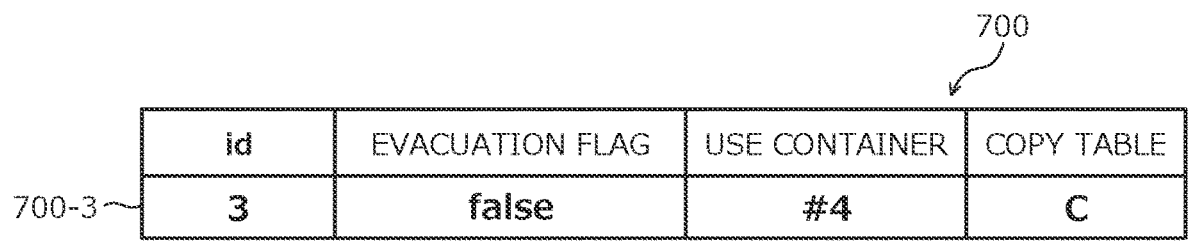
FIG. 15 is an explanatory diagram (part 2) illustrating an example in which scale-out is performed.

FIGS. 14 and 15 are explanatory diagrams illustrating an example of scale-out. In FIG. 14, if the evaluation value of the scale-out is equal to or more than the evaluation value of the evacuation, the information processing device 100 determines to transmit the high-load query to a new container to be added. In the example in FIG. 14, it is assumed that, since the evaluation value of the scale-out is less than the evaluation value of the evacuation, the information processing device 100 determine to transmit the high-load query to the new container to be added.

The information processing device 100 specifies a table group to be copied to a container to be added. For example, the information processing device 100 specifies a table group to be the access unit of the high-load query as the table group to be copied to the container to be added. In the example in FIG. 14, the information processing device 100 specifies the table group "table C" to be the access unit of the high-load query having the id "3" as the table group to be copied to the container to be added.

As a result, the information processing device 100 can appropriately add the container and can perform scale-out. The information processing device 100 can select a table to be preferably copied to the container to be added and can suppress an increase in a data amount of the table to be copied to the container to be added. Therefore, the information processing device 100 can reduce a time required when the container is added and can reduce the processing load of the information processing system 300 applied when the container is added. The processing load may include, for example, a communication load or the like.

The information processing device 100 performs scale-out and adds a new container having the specified table group. In the example in FIG. 14, the information processing device 100 adds a new container #4 having a table group "table C". As a result, the information processing device 100 can generate a new transmission destination to which the high-load query is transmitted. Next, description proceeds to FIG. 15.

In FIG. 15, the information processing device 100 generates a record 700-3, indicating that the container #4 is added as the new transmission destination of the high-load query having the id "3", that associates the container #4 with the table group "table C" included in the container #4. The information processing device 100 stores the generated record 700-3 in the query information management table 700 and manages the record 700-3.

Returning to the description in FIG. 14, the information processing device 100 refers to the query information management table 700 and controls the communication control device 301 to transmit the high-load query having the id "3" to the container #4 thereafter. The communication control device 301 recognizes the container #4 as the transmission destination of the high-load query having the id "3", under the control of the information processing device 100.

In a case of receiving the high-load query having the id "3" from the client device 303 under the control of the information processing device 100, the communication control device 301 transmits the received high-load query having the id "3" to the container #4. For example, the communication control device 301 transmits the received high-load query having the id "3" to any one of one or more containers having the table group "table C", including the container #4, so that the processing load is distributed.

As a result, the information processing device 100 can transmit the high-load query to the container #4 and can reduce the processing load of the container #1. Therefore, the information processing device 100 can use a relatively large resource amount for the high-load query in the container #4, as compared with the container #1. Therefore, the information processing device 100 can improve the processing performance regarding the high-load query. When performing scale-out, the information processing device 100 can suppress an increase in a data amount of a table to be copied to the container #4 to be added. Therefore, the information processing device 100 can reduce a time required when the container #4 is added and can reduce the processing load of the information processing system 300 applied when the container #4 is added.

Next, with reference to FIGS. 16 and 18, an example will be described in which the information processing device 100 performs scale-in and deletes the added container.

Figure 16:
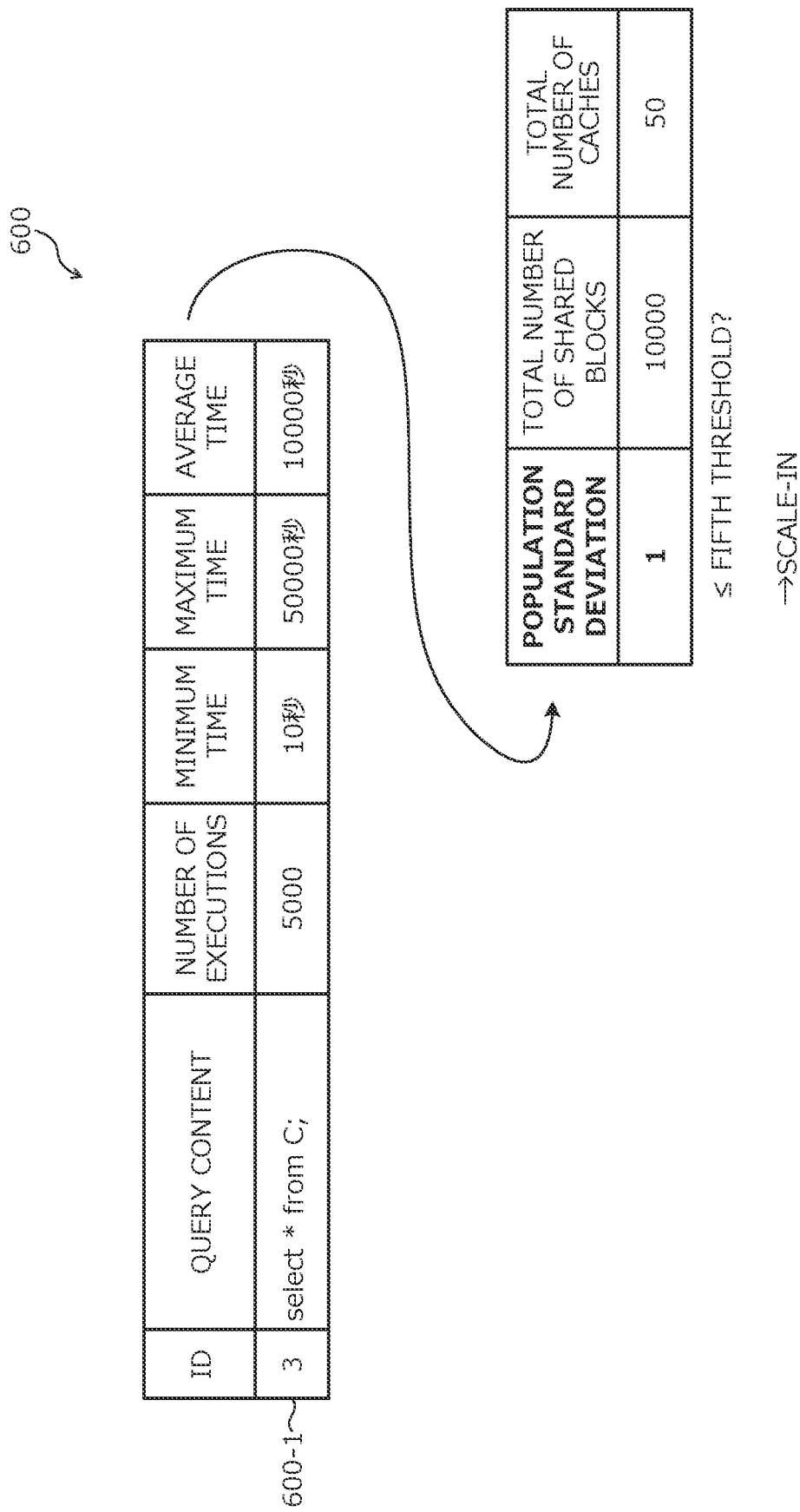
FIG. 16 is an explanatory diagram (part 1) illustrating an example in which scale-in is performed.
Figure 17:
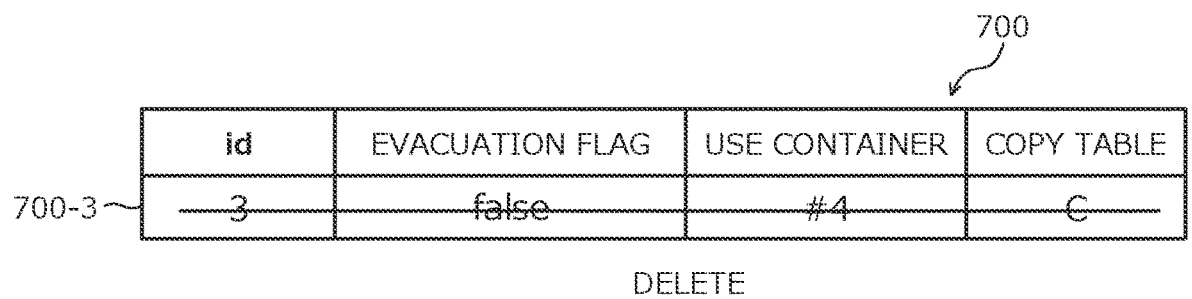
FIG. 17 is an explanatory diagram (part 2) illustrating an example in which scale-in is performed.
Figure 18:
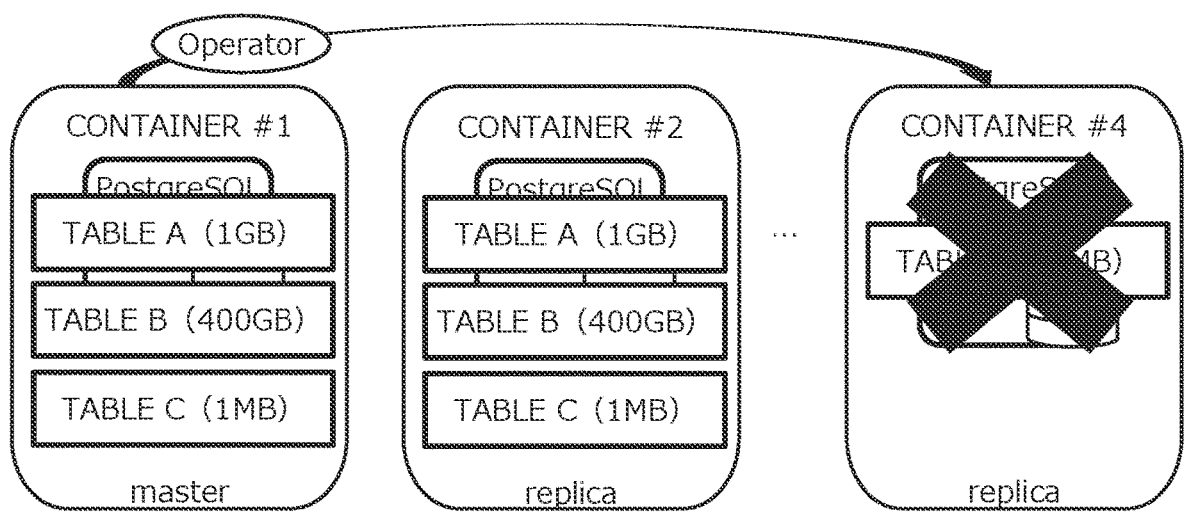
FIG. 18 is an explanatory diagram (part 3) illustrating an example in which scale-in is performed.

FIGS. 16 to 18 are explanatory diagrams illustrating an example in which scale-in is performed. In FIG. 16, it is assumed that the information processing device 100 have added the container #4. The information processing device 100 includes the statistical information management table 600 regarding the container #4.

The information processing device 100 refers to the statistical information management table 600 and determines whether or not the population standard deviation of the record of the high-load query falls below a fifth threshold. The fifth threshold is preset by a user, for example. For example, the fifth threshold may be the same as the first threshold or may be different from the first threshold. The fifth threshold is, for example, one. In the example in FIG. 16, the information processing device 100 determines that a population standard deviation of a record 600-1 of a high-load query having an id "3" falls below one.

The information processing device 100 detects that the population standard deviation of the record of the high-load query falls below the fifth threshold, based on the determined result. In the example in FIG. 16, the information processing device 100 detects that the population standard deviation of the record 600-1 of the high-load query having the id "3" falls below one. As a result, the information processing device 100 can detect a situation where the added container #4 may be deleted. For example, the information processing device 100 can detect a situation where the increase in the processing load of the information processing system 300 can be suppressed even if the added container #4 is deleted. Next, description proceeds to FIG. 17.

In FIG. 17, since the information processing device 100 detects that the population standard deviation of the record of the high-load query falls below the fifth threshold, the information processing device 100 performs scale-in and determines to delete the container #4 added as the transmission destination of the high-load query. The information processing device 100 deletes the record 700-3 regarding the added container #4 from the query information management table 700. Next, description proceeds to FIG. 18.

In FIG. 18, the information processing device 100 refers to the query information management table 700 and controls the communication control device 301 to transmit the high-load query having the id "3" to any one of remaining containers having the table group "table C" thereafter. For example, the information processing device 100 controls the communication control device 301 to transmit the high-load query having the id "3" to the container #1 having the table group "table C" thereafter. In a case of receiving the high-load query having the id "3" from the client device 303, the communication control device 301 transmits the received high-load query having the id "3" to the container #1.

As a result, the information processing device 100 can transmit the high-load query to the container #1 and can appropriately process the high-load query. The information processing device 100 can perform scale-in and can reduce the operation cost of the information processing system 300. The information processing device 100 can suppress the increase in the processing load of the information processing system 300 even if the added container #4 is deleted.

(Overall Processing Procedure)

Next, an example of an overall processing procedure executed by the information processing device 100 will be described with reference to FIG. 19. The overall processing is implemented by, for example, the CPU 501, the storage area such as the memory 502 or the recording medium 505, and the network I/F 503 illustrated in FIG. 5.

Figure 19:
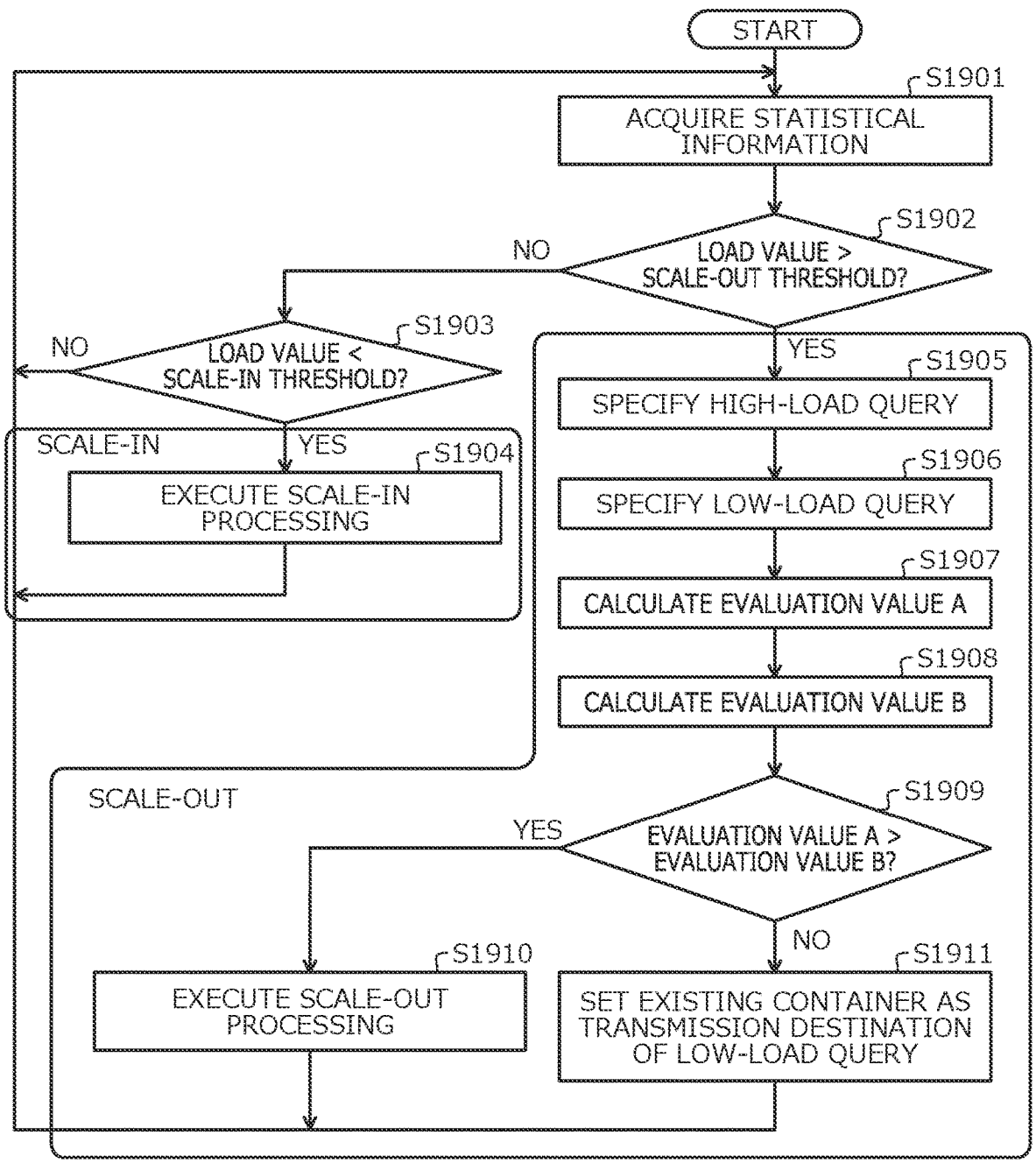
FIG. 19 is a flowchart illustrating an example of an overall processing procedure.

FIG. 19 is a flowchart illustrating an example of the overall processing procedure. In FIG. 19, the information processing device 100 acquires statistical information including a load value regarding a processing load of a query using a table group as an access unit, regarding a target container (step S1901).

Next, the information processing device 100 determines whether or not the load value regarding the processing load of the query using any one of the table groups as the access unit>a scale-out threshold, based on the acquired statistical information (step S1902). Here, in a case where the load value≤the scale-out threshold (step S1902: No), the information processing device 100 proceeds to processing in step S1903. On the other hand, in a case where the load value>the scale-out threshold (step S1902: Yes), the information processing device 100 proceeds to processing in step S1905.

In step S1903, the information processing device 100 determines whether or not the load value regarding the processing load of the query using any one of the table groups as the access unit<a scale-in threshold, based on the acquired statistical information (step S1903). Here, in a case where the load value≥the scale-in threshold (step S1903: No), the information processing device 100 returns to the processing in step S1901. On the other hand, in a case where the load value<the scale-in threshold (step S1903: Yes), the information processing device 100 proceeds to processing in step S1904.

In step S1904, the information processing device 100 performs scale-in processing (step S1904). The scale-in processing is processing of deleting the target container and setting a transmission destination of a query using the table group in which the load value<the scale-in threshold as the access unit as an existing container having the table group. Then, the information processing device 100 returns to the processing in step S1901.

In step S1905, the information processing device 100 specifies a high-load query of which a population standard deviation is equal to or more than a high-load reference value, based on the statistical information (step S1905). Next, the information processing device 100 specifies a low-load query of which a population standard deviation is less than the high-load reference value, based on the statistical information (step S1906).

Next, the information processing device 100 calculates an evaluation value A regarding scale-out (step S1907). Furthermore, the information processing device 100 calculates an evaluation value B regarding evacuation of the low-load query (step S1908). Then, the information processing device 100 determines whether or not the evaluation value A>the evaluation value B (step S1909).

Here, in a case where the evaluation value A>the evaluation value B (step S1909: Yes), the information processing device 100 proceeds to processing in step S1910. On the other hand, in a case where the evaluation value A≤the evaluation value B is not satisfied (step S1909: No), the information processing device 100 proceeds to processing in step S1911.

In step S1910, the information processing device 100 performs scale-out processing (step S1910). The scale-out processing is, for example, processing of generating a new container having a table group to be an access unit of a high-load query and setting the generated new container as a transmission destination of the high-load query. Then, the information processing device 100 returns to the processing in step S1901.

In step S1911, the information processing device 100 sets the transmission destination of the low-load query as an existing container having a table group to be the access unit of the low-load query (step S1911). Then, the information processing device 100 returns to the processing in step S1901.

Here, the information processing device 100 may switch some steps in the processing order in FIG. 19 and execute the processing. For example, the orders of the processing in steps S1907 and S1908 can be switched. Furthermore, the information processing device 100 may omit some steps in the processing in FIG. 19.

As described above, according to the information processing device 100, it is possible to store the statistical information indicating the statistical value regarding the processing load of the query, for each data group to be the access unit of the query, in the first data constellation included in the first execution environment. According to the information processing device 100, it is possible to specify the first data group of which the processing load of the query is less than the first reference value, in the first data constellation, based on the statistical information. According to the information processing device 100, it is possible to specify the second execution environment having the second data constellation including the specified first data group, included in the plurality of execution environments, other than the first execution environment. According to the information processing device 100, it is possible to control the plurality of execution environments, to transmit the new query using the specified first data group as the access unit, to the specified second execution environment. As a result, the information processing device 100 can evacuate the query and reduce the processing load of the first execution environment.

According to the information processing device 100, it is possible to specify the second execution environment having the second data constellation that includes the specified first data group and does not include at least any one of pieces of data other than the first data group in the first data constellation, included in the plurality of execution environments. As a result, the information processing device 100 can specify the second execution environment that includes the first data group but does not include any one of the tables included in the first execution environment. Therefore, the information processing device 100 can prevent the processing load in the second execution environment in which the query is evacuated from being equal to or more than a certain value, after evacuating the query.

According to the information processing device 100, it is possible to specify the second execution environment that has the data constellation including the specified first data group and has the smaller measurement value regarding the processing load than the other execution environments, included in the plurality of execution environments. As a result, the information processing device 100 can specify the second execution environment that includes the first data group and of which the processing load is relatively small. Therefore, the information processing device 100 can prevent the processing load in the second execution environment in which the query is evacuated from being equal to or more than a certain value, after evacuating the query.

According to the information processing device 100, it is possible to specify the first data group of which the processing load of the query is less than the first reference value and the index value regarding the number of times when the query is received is equal to or more than the predetermined value, in the first data constellation, based on the statistical information. As a result, the information processing device 100 can specify the query that is expected to have a relatively high reduction effect of the processing load of the first execution environment caused by evacuation.

According to the information processing device 100, it is possible to specify the second data group of which the processing load of the query is equal to or more than the second reference value, in the first data constellation, based on the statistical information. According to the information processing device 100, it is possible to generate the new third execution environment, different from the plurality of execution environments, having the third data constellation that includes the specified second data group and does not include at least any one of the pieces of the first data constellation and add the third execution environment to the plurality of execution environments. According to the information processing device 100, it is possible to control the plurality of execution environments to transmit the new query using the specified second data group as the access unit to the added third execution environment. As a result, the information processing device 100 can appropriately add the container. The information processing device 100 can select a table to be preferably copied to the container to be added and can suppress an increase in a data amount of the table to be copied to the container to be added. Therefore, the information processing device 100 can reduce a time required when the container is added and can reduce the processing load of the information processing system 300 applied when the container is added.

According to the information processing device 100, in a case where the information processing device 100 detects that the processing load of the query falls below the third reference value, for the specified second data group, in the first data constellation, based on the statistical information, it is possible to delete the added third execution environment from the plurality of execution environments. According to the information processing device 100, it is possible to control the plurality of execution environments to transmit the new query using the specified second data group as the access unit to the fourth execution environment having the fourth data constellation that includes the specified second data group, among the plurality of execution environments. As a result, the information processing device 100 can reduce the overall operation cost of the plurality of execution environments.

According to the information processing device 100, it is possible to calculate the first index value indicating the magnitude of the reduction effect on the processing load of the query in a case where the new query using the specified first data group as the access unit is transmitted to the searched second execution environment. According to the information processing device 100, it is possible to calculate the second index value indicating the magnitude of the reduction effect on the processing load of the query in a case where the new query using the specified second data group as the access unit is transmitted to the added third execution environment. According to the information processing device 100, in a case where the calculated first index value is larger than the calculated second index value by the value equal to or more than the certain value, it is possible to control the plurality of execution environments to transmit the new query using the specified first data group as the access unit to the specified second execution environment. According to the information processing device 100, in a case where the calculated first index value is not larger than the calculated second index value by the value equal to or more than the certain value, it is possible to control the plurality of execution environments to transmit the new query using the specified second data group as the access unit to the added third execution environment. As a result, in a case where it is more preferable evacuating the query than transmitting the query to the new execution environment, the information processing device 100 can evacuate the query and can efficiently reduce the processing load of the first execution environment. In a case where it is more preferable transmitting the query to the new execution environment than evacuating the query, the information processing device 100 can transmit the query to the new execution environment and can efficiently reduce the processing load of the first execution environment.

According to the information processing device 100, it is possible to specify the first data group of which the processing load of the query is less than the first reference value, in the first data constellation, based on the statistical information, according to that the second data group is specified. As a result, the information processing device 100 can specify the first data group only in a situation in which the second data group is specified, the query of which the processing load is relatively large exists, and it is preferable to reduce the processing load of the first execution environment. Therefore, the information processing device 100 can reduce the processing load of the own device.

According to the information processing device 100, it is possible to specify the first data group of which the processing load of the query is less than the first reference value, in the first data constellation, other than the second data group, based on the statistical information. As a result, the information processing device 100 can prevent the second data group and the first data group from overlapping each other and can prevent occurrence of an error when the processing load of the execution environment is reduced.

According to the information processing device 100, it is possible to select the first execution environment of which the measurement value regarding the processing load is larger than that of the other execution environments, based on the measurement value regarding the processing load of each of the plurality of execution environments at the current time point. According to the information processing device 100, it is possible to specify the first data group of which the processing load of the query is less than the first reference value, in the first data constellation included in the selected first execution environment, based on the statistical information. As a result, the information processing device 100 can select the first execution environment to be processed and can reduce the processing load of the own device.

The information processing device 100 can be applied to a case where each of the plurality of execution environments is a container. As a result, the information processing device 100 can reduce the processing load of the container.

The information processing device 100 can be applied to a case where the data is a table. As a result, the information processing device 100 can reduce the processing load of the execution environment having the table.

According to the information processing device 100, it is possible to store the statistical information indicating the statistical value regarding the processing load of the query, for each data group to be the access unit of the query, in the first data constellation included in the first execution environment. According to the information processing device 100, it is possible to specify the first data group of which the processing load of the query is equal to or more than the first reference value, in the first data constellation, based on the statistical information. According to the information processing device 100, it is possible to generate the new second execution environment, different from the plurality of execution environments, having the second data constellation that includes the specified first data group and does not include at least any one of the pieces of the first data constellation and add the second execution environment to the plurality of execution environments. According to the information processing device 100, it is possible to control the plurality of execution environments to transmit the new query using the specified first data group as the access unit to the added second execution environment. As a result, the information processing device 100 can appropriately add the container. The information processing device 100 can select a table to be preferably copied to the container to be added and can suppress an increase in a data amount of the table to be copied to the container to be added. Therefore, the information processing device 100 can reduce a time required when the container is added and can reduce the processing load of the information processing system 300 applied when the container is added.

Note that the control method described in the present embodiment may be implemented by executing a program prepared in advance, on a computer such as a PC or a workstation. The control program described in the present embodiment is executed by being recorded on a computer-readable recording medium and being read from the recording medium by the computer. The recording medium is a hard disk, a flexible disk, a compact disc (CD)-ROM, a magneto optical disc (MO), a digital versatile disc (DVD), or the like. Furthermore, the control program described in the present embodiment may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control method in which a computer executes processing comprising:
    specifying a first data group of which a population standard deviation regarding a query processing time included in statistical information is less than a first reference value for each data group of data groups in a first data constellation of data constellations to be an access unit of a query, in the first data constellation included in a first execution environment included in a plurality of execution environments that has different data constellations among the data constellations;
    specifying a second execution environment that has a second data constellation of the data constellations, that includes the specified first data group, included in the plurality of execution environments, other than the first execution environment; and
    controlling the plurality of execution environments to transmit a new query that uses the specified first data group as an access unit to the specified second execution environment,
    wherein the processing further includes:
    specifying a second data group of which a processing load of a query is equal to or more than a second reference value, in the first data constellation, based on the statistical information;

generating a new third execution environment, different from the plurality of execution environments, that has a third data constellation among the data constellations that includes the specified second data group and does not include at least any one of pieces of the first data group of the first data constellation and adding the third execution environment to the plurality of execution environments; and controlling the plurality of execution environments to transmit a new query that uses the specified second data group as an access unit, to the added third execution environment, wherein the processing further includes:

calculating a first index value that indicates a magnitude of a reduction effect on a processing load of a query in a case where a new query that uses the specified first data group as an access unit is transmitted to the specified second execution environment; and calculating a second index value that indicates a magnitude of a reduction effect on a processing load of a query in a case where a new query that uses the specified second data group as an access unit is transmitted to the added third execution environment, wherein the processing of performing transmission to the second execution environment controls the plurality of execution environments to transmit the new query that uses the specified first data group as an access unit to the specified second execution environment, in a case where the calculated first index value is larger than the calculated second index value by a value equal to or more than a certain value, and the processing of performing transmission to the third execution environment controls the plurality of execution environments to transmit the new query that uses the specified second data group as an access unit to the added third execution environment, in a case where the calculated first index value is not larger than the calculated second index value by the value equal to or more than the certain value.

2. The control method according to claim 1, wherein the processing of specifying the second execution environment specifies a second execution environment that has a second data constellation that includes the specified first data group and does not include at least any one of pieces of data other than the specified first data group, in the first data constellation, included in the plurality of execution environments, other than the first execution environment.

3. The control method according to claim 1, wherein the processing of specifying the second execution environment specifies a second execution environment that has a data constellation that includes the specified first data group and has a measurement value regarding a processing load smaller than that of another execution environment, included in the plurality of execution environments, other than the first execution environment, based on a measurement value regarding a processing load of each execution environment of the plurality of execution environments at a current time point.

4. The control method according to claim 1, in which the computer executes processing comprising:

deleting the added third execution environment from the plurality of execution environments, in a case of detecting that a processing load of a query falls below a third reference value, for the specified second data group, in the first data constellation, based on the statistical information; and controlling the plurality of execution environments to transmit a new query that uses the specified second data group as an access unit to a fourth execution environment that has a fourth data constellation that includes the specified second data group, among the plurality of execution environments.

5. The control method according to claim 1, wherein the processing of specifying the first data group specifies a first data group of which a processing load of a query is less than the first reference value, in the first data constellation, based on the statistical information, according to that the second data group is specified.

6. The control method according to claim 1, wherein the processing of specifying the first data group specifies a first data group of which a processing load of a query is less than the first reference value, in the first data constellation, other than the second data group, based on the statistical information.

7. The control method according to claim 1, in which the computer executes processing comprising:

selecting a first execution environment of which a measurement value regarding a processing load is larger than that of another execution environment, based on a measurement value regarding a processing load of each execution environment of the plurality of execution environments at a current time point, wherein the processing of specifying the first data group specifies a first data group of which a processing load of a query is less than the first reference value, in a first data constellation included in the selected first execution environment, based on the statistical information.

8. The control method according to claim 1, wherein each execution environment of the plurality of execution environments is a container.

9. The control method according to claim 1, wherein data of each data constellation of the data constellations is a table.

10. The control method according to claim 1, wherein the statistical information includes a number of times when a query is received, and the processing of specifying the data group specifies the data group of which the population standard deviation is less than the reference value and an index value regarding the number of times when the query is received is equal to or more than a predetermined value, in the first data constellation.

11. A non-transitory computer-readable recording medium storing a control program in which a computer executes processing comprising:

specifying a data group of which a population standard deviation regarding a query processing time included in statistical information is less than a reference value for each data group of data groups in a first data constellation of data constellations to be an access unit of a query, in the first data constellation included in a first execution environment included in a plurality of execution environments that has different data constellations among the data constellations;

specifying a second execution environment that has a second data constellation of the data constellations, that includes the specified first data group, included in the plurality of execution environments, other than the first execution environment; and controlling the plurality of execution environments to transmit a new query that uses the specified first data group as an access unit to the specified second execution environment, wherein the processing further includes:

specifying a second data group of which a processing load of a query is equal to or more than a second reference value, in the first data constellation, based on the statistical information;

generating a new third execution environment, different from the plurality of execution environments, that has a third data constellation among the data constellations that includes the specified second data group and does not include at least any one of pieces of the first data group of the first data constellation and adding the third execution environment to the plurality of execution environments; and controlling the plurality of execution environments to transmit a new query that uses the specified second data group as an access unit, to the added third execution environment, wherein the processing further includes:

calculating a first index value that indicates a magnitude of a reduction effect on a processing load of a query in a case where a new query that uses the specified first data group as an access unit is transmitted to the specified second execution environment; and calculating a second index value that indicates a magnitude of a reduction effect on a processing load of a query in a case where a new query that uses the specified second data group as an access unit is transmitted to the added third execution environment, wherein the processing of performing transmission to the second execution environment controls the plurality of execution environments to transmit the new query that uses the specified first data group as an access unit to the specified second execution environment, in a case where the calculated first index value is larger than the calculated second index value by a value equal to or more than a certain value, and the processing of performing transmission to the third execution environment controls the plurality of execution environments to transmit the new query that uses the specified second data group as an access unit to the added third execution environment, in a case where the calculated first index value is not larger than the calculated second index value by the value equal to or more than the certain value.

12. The non-transitory computer-readable recording medium according to claim 11, wherein the statistical information includes a number of times when a query is received, and the processing of specifying the data group specifies the data group of which the population standard deviation is less than the reference value and an index value regarding the number of times when the query is received is equal to or more than a predetermined value, in the first data constellation.

13. An information processing device comprising:
a memory; and
a processor coupled to the memory and configured to:
specify a data group of which a population standard deviation regarding a query processing time included in statistical information is less than a reference value for each data group of data groups in a first data constellation of data constellations to be an access unit of a query, in the first data constellation included in a first execution environment included in a plurality of execution environments that has different data constellations among the data constellations;

specify a second execution environment that has a second data constellation of the data constellations, that includes the specified data group, included in the plurality of execution environments, other than the first execution environment; and control the plurality of execution environments to transmit a new query that uses the specified data group as an access unit to the specified second execution environment, wherein the processor:

specifies a second data group of which a processing load of a query is equal to or more than a second reference value, in the first data constellation, based on the statistical information;

generates a new third execution environment, different from the plurality of execution environments, that has a third data constellation among the data constellations that includes the specified second data group and does not include at least any one of pieces of the first data group of the first data constellation and adding the third execution environment to the plurality of execution environments; and controls the plurality of execution environments to transmit a new query that uses the specified second data group as an access unit, to the added third execution environment, wherein the processor:

calculates a first index value that indicates a magnitude of a reduction effect on a processing load of a query in a case where a new query that uses the specified first data group as an access unit is transmitted to the specified second execution environment; and calculates a second index value that indicates a magnitude of a reduction effect on a processing load of a query in a case where a new query that uses the specified second data group as an access unit is transmitted to the added third execution environment, wherein the processing to transmit to the second execution environment controls the plurality of execution environments to transmit the new query that uses the specified first data group as an access unit to the specified second execution environment, in a case where the calculated first index value is larger than the calculated second index value by a value equal to or more than a certain value, and the processing to transmit to the third execution environment controls the plurality of execution environments to transmit the new query that uses the specified second data group as an access unit to the added third execution environment, in a case where the calculated first index value is not larger than the calculated second index value by the value equal to or more than the certain value.

14. The information processing device according to claim 13, wherein the statistical information includes a number of times when a query is received, and the processing to specify the data group specifies the data group of which the population standard deviation is less than the reference value and an index value regarding the number of times when the query is received is equal to or more than a predetermined value, in the first data constellation.

* * * * *